US008511051B2

(12) United States Patent
Pellenc et al.

(10) Patent No.: US 8,511,051 B2
(45) Date of Patent: Aug. 20, 2013

(54) BERRY HARVESTING MACHINE, ESPECIALLY GRAPE HARVESTING MACHINE, EQUIPPED WITH A SHAKING SYSTEM AND MECHATRONIC SHAKING CONTROL FOR THIS SYSTEM

(75) Inventors: Roger Pellenc, Pertuis (FR); Jean-Marc Gialis, Cheval Blanc (FR)

(73) Assignee: Pellenc (Societe Anonyme), Pertuis (FR)

( * ) Notice: Subject to any disclaimer, the term of this patent is extended or adjusted under 35 U.S.C. 154(b) by 1004 days.

(21) Appl. No.: 12/504,599

(22) Filed: Jul. 16, 2009

(65) Prior Publication Data

US 2010/0024373 A1  Feb. 4, 2010

(30) Foreign Application Priority Data

Aug. 1, 2008 (FR) ..................................... 08 04408

(51) Int. Cl.
*A01D 46/00* (2006.01)
(52) U.S. Cl.
USPC ........................................... 56/330; 56/340.1
(58) Field of Classification Search
USPC ............................... 56/328.1, 330, 332, 340.1
See application file for complete search history.

(56) References Cited

U.S. PATENT DOCUMENTS

| 3,344,591 | A | * | 10/1967 | Christie et al. | 56/330 |
|---|---|---|---|---|---|
| 3,385,042 | A | * | 5/1968 | Christie et al. | 56/330 |
| 3,727,388 | A | * | 4/1973 | Smith | 56/330 |
| 3,911,653 | A | * | 10/1975 | Burton | 56/330 |
| 4,016,711 | A | * | 4/1977 | Claxton | 56/330 |
| 4,022,001 | A | * | 5/1977 | Burton | 56/330 |
| 4,063,406 | A | * | 12/1977 | Burton | 56/330 |
| 4,114,463 | A | * | 9/1978 | Garden et al. | 74/61 |
| 4,236,371 | A | * | 12/1980 | Claxton | 56/330 |
| 4,250,700 | A | * | 2/1981 | Horn et al. | 56/330 |
| 4,336,682 | A | * | 6/1982 | Orlando | 56/330 |
| 4,750,322 | A | * | 6/1988 | Korthuis | 56/328.1 |
| 4,769,979 | A | * | 9/1988 | Merant | 56/330 |
| 4,771,594 | A | * | 9/1988 | Deux et al. | 56/330 |
| 4,924,666 | A | * | 5/1990 | Poncet | 56/330 |
| 4,959,950 | A | * | 10/1990 | Burke | 56/340.1 |
| 4,974,405 | A | * | 12/1990 | Littau | 56/330 |
| 5,074,108 | A | * | 12/1991 | Claxton et al. | 56/330 |
| 5,259,177 | A | * | 11/1993 | Windemuller et al. | 56/330 |
| 5,291,726 | A | * | 3/1994 | Nairn | 56/330 |
| 5,495,708 | A | * | 3/1996 | Scott et al. | 56/329 |
| 5,642,610 | A | * | 7/1997 | Dupon et al. | 56/340.1 |
| 6,003,294 | A | * | 12/1999 | Fitzgerald et al. | 56/330 |
| 6,076,343 | A | * | 6/2000 | Burke | 56/330 |
| 6,155,036 | A | * | 12/2000 | Pellenc | 56/328.1 |
| 6,502,380 | B1 | * | 1/2003 | Merant et al. | 56/330 |
| 6,854,254 | B2 | * | 2/2005 | Merant | 56/330 |
| 7,500,342 | B2 | * | 3/2009 | Merant et al. | 56/330 |

(Continued)

*Primary Examiner* — Thomas B Will
*Assistant Examiner* — Joan D Misa
(74) *Attorney, Agent, or Firm* — Egbert Law Offices, PLLC

(57) ABSTRACT

Berry, such as grape, harvesting machine includes a plurality of superimposed shakers formed by flexible bars, and attached through their ends to two vertical shafts. At least one shaft is an oscillating actuation shaft controlled by a mechatronic shaking control permitting an oscillating movement. The mechatronic shaking control includes an eccentric system connected to the actuating shaft through a connecting rod, and the rotation axis of the eccentric system is mounted with an orientation adjustable in a plane parallel to the median plane of the machine so that any modification of this orientation permits to modify the amplitude of the oscillating movement of the actuating shaft, and, consequently the amplitude of the shaking movement of the shakers.

16 Claims, 21 Drawing Sheets

(56) References Cited

U.S. PATENT DOCUMENTS

| | | | |
|---|---|---|---|
| 7,841,160 B2 * | 11/2010 | Pellenc et al. | 56/340.1 |
| 8,069,641 B2 * | 12/2011 | Pellenc et al. | 56/328.1 |
| 2009/0056297 A1 * | 3/2009 | Pellenc et al. | 56/330 |

* cited by examiner

BERRY HARVESTING MACHINE, ESPECIALLY GRAPE HARVESTING MACHINE, EQUIPPED WITH A SHAKING SYSTEM AND MECHATRONIC SHAKING CONTROL FOR THIS SYSTEM

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

This invention concerns a berry harvesting machine, especially a grape harvesting machine, of the type with a harvesting head comprising two berry detaching assemblies placed face-to-face and consisting each of a plurality of superimposed picking arms or shakers.

Said vertically spaced out shakers consist of flexible bars and are attached, through their opposite ends, on one hand, onto a vertical activation shaft, and on the other hand, onto a fixed vertical shaft, either oscillating or rotating freely.

A vertical space, usually designed as "pinch" is provided between the two berry detaching assemblies or shaking assemblies.

The invention concerns more specifically the mechatronic shaking control for the shaking assemblies of such machine.

It also concerns a mechatronic shaking control method.

2. Description of Related Art Including Information Disclosed Under 37 CFR 1.97 and 37 CFR 1.98

The world of viticulture is today constantly looking for solutions to improve the various harvesting systems of grape harvesters.

For a few decades, many solutions have been proposed to the wine growers who use mechanical grape harvesting, or to those who used to harvest by hand and became mechanized based on the harvesting quality level achieved with modern grape harvesters.

However, the quality of the grape harvest achieved still remains highly random and depends on several parameters, including human assessment parameters and mechanical performance parameters of the systems that make up the harvesting head of such machine.

With regard to human parameters, significant progress has been made in the ergonomics of the controls for adjustment of the harvesting part of grape harvesters. For the harvesting head adjusting part, three main separate assemblies can be considered: The vine shaking part, the harvest conveying part and the harvest cleaning part. These ergonomic accesses to the various adjustments of a vine harvester harvesting head enable the vine growers to apprehend much more quickly the adjustments so as to obtain the best quality results for the harvest.

With regard to the mechanical performance parameters, many improvements have been made on the three parts described above, and more specifically on the vine shaking systems.

The vine shaking system is by far the most important part of a grape harvester harvesting head.

It is indeed easy to understand that on a harvesting head, one part of the systems is designed to correct any insufficient quality generated by the other systems. For example, the vine cleaning system must be all the more performing as the shaking system is less since it generates a lot of leaves and plant debris of all kinds that are to be eliminated.

Several control systems for harvester shaking systems, such as self-propelled or tractor-drawn grape harvesters are currently well-known. These control devices are more or less sophisticated depending on the various constructors and the performance levels sought.

Regarding the grave harvester shaking systems, one must take into account that they comprise two separate parts:

On one hand, the shakers that transmit the vibration onto the vine to make the grapes fall in the best quality conditions possible, and On the other hand, what is called the shaking control, designed to activate said shakers in a more or less controlled manner and with more or less precision.

There are at the present time two main types of shaking controls.

I—The Common So-Called "Conventional" Shaking Controls

These are non adjustable or little adjustable shaking controls. They generally consist of a crank-rod system and do not allow for the basic adjustments that are adjustment of the shaker amplitude and adjustment of the pinch between the shaker assemblies, except for a manual or semi-manual adjustment directly on the shaking control. The shaking frequency can be adjusted at the operator's station on most shaking controls as this adjustment is very easy to make and most of all inexpensive. It is generally made using a hydraulic motor that drives the crank system in rotation. The crank rotation speed gives the number of strokes per minute for adjustment of the shaking frequency.

The so-called conventional controls have the verybig advantage of being simple and sturdy. This is the reason why they are greatly used by the various grape harvester constructors. Their designs are very simple and require only very little electronics, or even none at all. Since they are all made from a crank-rod system with continuous rotational motion and an associated flywheel, they use very little power as, once started, the shaking faces as sole opposition the vegetation, it being understood that the rotation is continuous and smoothed by the flywheel.

On the other hand, the so-called conventional shaking controls with a crank-rod system have the very big disadvantage of being very rigid controls; i.e., regardless of the conformation and hardness of the obstacles getting into the shaking system, the crank-rod system never stalls, at the risk of mechanical damage. The reason for such damage is that, since the stresses generated in the rods cannot be controlled especially when they occur at the top dead center of the crank-rod system, it is difficult to size the mechanical parts so as to ensure reliability of the shaking control regardless of the obstacles getting into the shaking device.

The so-called conventional shaking controls with a crank-rod system also have the disadvantage of not being easily adjustable. Three main adjustments necessary for a shaking control are namely to be noted:
1) The shaking frequency adjustment is generally done using a hydraulic motor.
2) The adjustment of the pinch between the shakers: such adjustment is usually achieved through manual adjustment of the length of the connecting rod on the crank-rod system of the shaking control.
3) The shaker amplitude adjustment: this adjustment is especially difficult to achieve especially with a crank-rod system. It is indeed easy to understand that the only way to vary the shaker amplitude is to vary the radius of the crank, or to vary the connecting rod attachment position in relation to the rotation axis of the shaker activating shaft.

II—Electronic Shaking Control for Selective Harvesting

This control is described in FR-2 768 016 document.

To date, this control has been the best performing in terms of adjustments at the operator's station and of accuracy achieved. It permits to adjust all shaking parameters at the operator's station and in an accurate manner, including adjustment of the shaking frequency, adjustment of the pinch between the shakers, or adjustment of the shaker motion amplitude.

This shaking control has namely the peculiarity that the right side and the left side of the harvesting head are not mechanically coupled, which makes it easy to adjust the pinch between the shakers of both shaking assembles, i.e., between the shakers of the left assembly and the shakers of the right assembly.

The shaking control described in FR-2 768 016 document is not a control with a crank-rod system; it is activated by a hydraulic alternating jack system controlled by servo valves.

This hydraulic alternating jack system controlled by servo valves is a very big advantage not only in terms of adjustment, but also of flexibility. Contrary to a crank-rod system, this shaking control can indeed partially stall on a significant obstacle, for example a thick vine stock getting into the shaking system, which is usually an advantage. On the other hand, if the vegetation is very dense, the system may lack power and continuously stall, which is very problematic and limiting.

Since each right and left shaking assembly is independent and hydraulically and electronically controlled with precision, all adjustment possibilities on a control of this type can be considered.

The shaking control described in FR-2 768 016 document still has a rather serious disadvantage consisting of the fact that the absorbed power is much greater than that absorbed by a conventional crank-rod system. The overconsumption of power is approx. 40%-50%, which can prove to be a big problem, especially on low power machines, including on tractor-drawn grape harvesters that are usually drawn by low power tractors. In addition, this extra absorbed is transformed into heat in the hydraulic oil that must then be cooled, which is an additional economic disadvantage.

BRIEF SUMMARY OF THE INVENTION

This invention concerns a berry harvesting machine, more specifically a grape harvesting machine, equipped with a mechatronic shaking system, designed to be able to eliminate the above-mentioned disadvantages on the shaking control systems known to date. It applies especially to machines of the type comprising a shaking system consisting of two berry detaching assemblies mounted face to face and comprising each a plurality of superimposed shakers consisting of flexible bars attached through their ends to two vertical shafts, at least one of which being an oscillating actuation shaft controlled by a mechatronic shaking control permitting to apply to it an oscillatory motion.

The mechatronic shaking control under the invention is especially noteworthy in that it comprises an eccentric system connected to the actuation shaft of the shaking assemblies through a connecting rod and in that the rotation axis of this driving eccentric system is mounted with an orientation adjustable in a plane parallel to the median plane of the machine, so that any modification of this orientation permits to change the amplitude of the oscillatory movement of said actuation shaft.

According to a highly advantageous embodiment, the mechatronic shaking control system comprises two eccentrics mounted side by side on a swinging support or cradle, these two eccentric systems being actuated in rotation simultaneously and in sync by a common actuator, preferably consisting of a common hydraulic motor supported by said cradle and of a mechanical means of transmission with positive drive, also supported by said cradle whose pivoting is provided by an actuator and permits to achieve simultaneously and in sync an identical orientation of the eccentric rotation axes.

According to a preferred embodiment, the mechanical means of transmission with positive drive consists of a common gear link comprising a toothed wheel driven by the hydraulic motor or another common actuator, and meshing with a toothed wheel secured on the rotation shaft of each eccentric system.

According to another embodiment, the eccentric system or each eccentric system is integral with a flywheel.

According to another embodiment, the connecting rod is attached to the eccentric system through a bearing box acting as pivot and through two diametrically opposite pins connected to said bearing box, the axis of these pins being perpendicular to the eccentric rotation axis.

According to another embodiment, the cradle supporting the double eccentric control components is mounted with the ability to swing around an axis perpendicular to and concurrent with the rotation axes of the right and left eccentric assemblies.

According to another embodiment, the swinging cradle is equipped at its left and right ends with pivots mounted with rotation capability in bearings attached laterally onto the frame of the shaking system, an actuator connecting an upper element of the frame and an arm integral with the cradle, providing for the pivoting of the latter.

According to another important characteristic arrangement of the invention, the shaking shafts of the shaking assemblies are mounted with the capability of oscillating movement around their longitudinal axis and of a limited swinging movement around a point located in their lower part.

According to a preferred embodiment, the top part of each oscillating-swinging shaking shaft is mounted in a swivel bearing located with some moving latitude in a guide rigidly integral with the machine shaking system frame.

According to another preferred embodiment, the bottom part of each oscillating-swinging shaking shaft is mounted through an elastic bearing or swivel bearing.

According to another highly advantageous characteristic arrangement, the mobile upper swivel bearing of each actuation shaft is connected to a stress control jack According to a preferred embodiment, the stress control jack is designed to fulfill three functions:
a stress control function of the upper attachment mobile swivel bearing for each right or left shaking shaft;

an adjusting function of the pinch between the right and left shaking assemblies; and a quick opening function of the shaking system.

The mechatronic shaking control under the invention permits to make with precision all adjustments desirable to achieve the working quality expected from the machine shaking device. It also allows for a certain controlled and intelligent flexibility and does not use anymore power than a simple conventional crank-rod control, while transmitting as much power onto the vegetation.

BRIEF DESCRIPTION OF THE SEVERAL VIEWS OF THE DRAWINGS

The above purposes, characteristics and advantages and many more will become clearer from the description below and the attached drawings.

DETAILED DESCRIPTION OF THE INVENTION

Reference is made to said drawings to describe an interesting, although not limiting, example of embodiment of the harvesting machine under the invention and of implementation of its method and mechatronic shaking control system.

In order not to complicate unnecessarily the invention disclosure, only the mechatronic shaking control system is shown on the attached drawings and described in detail hereinafter, it being understood that the other parts of the machine using this system (frame, motorization, grave harvest conveyors, receiving bins, etc.) do not fall under this invention and can be executed in the usual manner well known to a person having ordinary skill in the art.

On the other hand, if an especially interesting application of the invention to a harvesting machine, usually designating a grape harvesting machine, is described hereinafter, it is obvious that it is also applicable to other harvesting machines of berries produced by bushes planted in lines, such as, for example: blackcurrant, olive, raspberry, currant, coffee cherry, etc.

Figure 1:
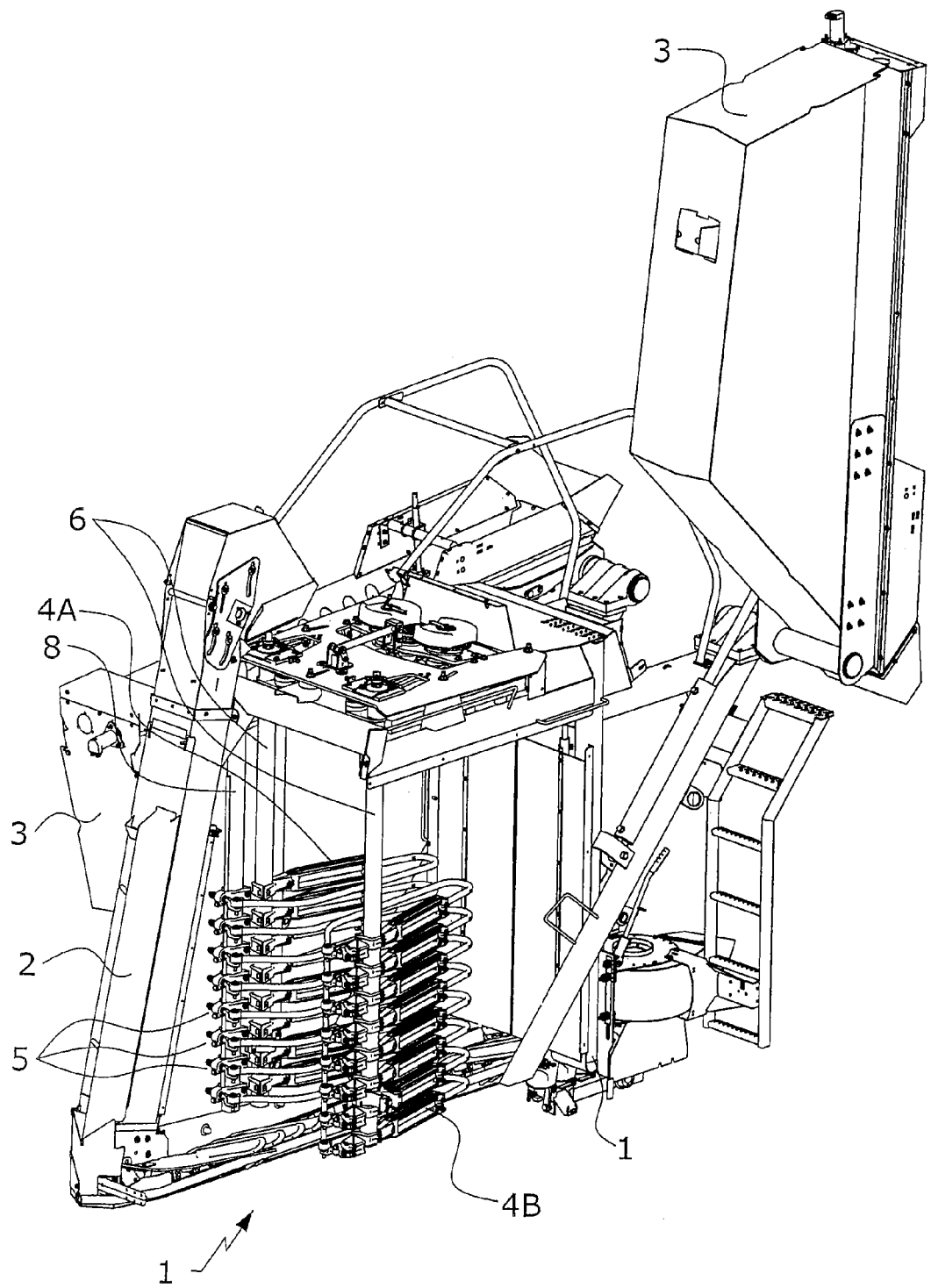
FIG. 1 is a simplified perspective view with partial pull-out of one embodiment of grape harvesting machine provided with a mechatronic shaking control under the invention.

FIG. 1 shows in a simplified manner a grape harvesting machine, comprising, in a known manner, a frame in a gantry shape, a harvesting head 1 carried by said frame and comprising two shaking assemblies facing each other, two conveying systems 2 to receive and transport the harvest up to two receiving bins 3 installed laterally and in the upper part of the frame. The latter is equipped with wheels (not shown) and the machine also comprises a motorization and regulating systems (not shown either), permitting, respectively, to drive and control the operation of its various active components. Such machine can be self-propelled or coupled to a tractor vehicle, for example to an agricultural tractor.

The harvesting head 1 is installed, preferably in a removable manner, inside the gantry or tunnel made up by the machine frame.

It basically includes (FIG. 2) a shaking system consisting of two berry detaching assemblies 4A and 4B mounted face to face and each comprising a plurality of superimposed picking or shaking arms 5. These vertically spaced-out shakers consist for example of flexible bars attached through their ends, on one hand, to a first vertical shaft 6 mounted with a capability of oscillating around its longitudinal axis a4, on the frame 7 of the shaking system, and, on the other hand, to a second vertical shaft 8 that is preferably fixed in relation to said frame 7, but that could be installed with motorized oscillation capability or rotating freely. As a general rule, the superimposed shakers 5 on each shaking assembly 4A, 4B are slightly offset vertically in relation to the shakers of the other shaking assembly placed face-to face.

Advantageously, the shakers 5 have the general shape of a hair pin consisting of two branches 5a, 5b slightly diverging, connecting through a curved portion, the end of one of these branches, or activation branch being designed to be connected to an actuation system (shaft 6), while the end of the other of said branches making up the active branch of the shaker is designed to be connected to a fixed support (shaft 8). These flexible shakers are made of a semi-rigid material, for example, polyamide or any other material with similar flexibility and bending strength characteristics (for example: polyester, fiberglass, etc.).

The active branch of those shakers has a length greater than the length of the activation branch thereof and an extreme portion curved in the direction of the longitudinal axis of said activation branch.

The main components of the mechatronic shaking control under the invention are arranged above the shaking assemblies 4A and 4B.

According to a first characteristic arrangement of the invention, the actuation of each shaker 5 activation shaft 6 is achieved using an eccentric system 9 connected to said shaft through a connecting rod 10, and the rotation axis a1 of this eccentric system is mounted with an adjustable orientation so that any modification of this orientation permits to modify the oscillation amplitude of said shaft and consequently the shaking movement amplitude of the shakers 5 attached to said activation arm 6.

According to a highly advantageous embodiment, two eccentric systems 9 are mounted side by side on a swinging support 11 referred to as "cradle" hereinafter. These two eccentric systems 9 being actuated in rotation simultaneously and in sync around axes a1 by a common actuator, preferably by a common hydraulic motor 12 supported by said cradle 11, and a mechanical means of transmission with positive drive, for example a common gear link placed between the two eccentric systems 9.

This gear link common to both eccentric systems permits to synchronize in rotation both eccentric systems along the rotations axes a1 and consequently to ensure the synchronized oscillation of both left and right shaking shafts 6 through left and right connecting rods 10.

The common gear link comprises for example a toothed wheel 13 driven by the hydraulic motor 12 and meshing with a toothed wheel 14 secured on the rotation shaft 9a of each eccentric system 9.

The common actuator 12 could consist of a motor other than a hydraulic motor, for example, an electric motor.

Each eccentric system is integral with a flywheel 15, for example mounted above the toothed wheel 14 of said system.

The connecting rod 10 is attached to the eccentric system 9 through a bearing box 16 acting as pivot and two pins 17 diametrically opposite and integral with said bearing box. The axis a2 of these pins is perpendicular to the rotation axis a1 of the eccentric system.

This combined link of the end of the connecting rod 10 and of the eccentric system 9 through a pivot and two perpendicular pins ensures a link identical to that of a universal joint.

The synchronized mounting and operation of both eccentric systems 9 placed side by side and with parallel rotation axes a1 permit to make a precision adjustment of the movement amplitude of the shakers 5 secured on the left and right shaking shafts 6 through the left and right connecting rods 10.

To that effect, the cradle 11 supporting the double eccentric control components is mounted with the ability to swing around an axis a3 perpendicular to and concurrent with the rotation axes a1 of the right and left eccentric assemblies 9.

The swinging cradle 11 is provided, at its right and left ends, with pivots 18 mounted with a rotation capability in bearings 19 secured laterally onto the frame 7 of the shaking system.

The cradle pivoting is achieved using an actuator 20, consisting for example of a hydraulic, electric or pneumatic jack.

This jack 20 connects, for example, an upper element 7a of the frame 7 and an arm 11a rigidly integral with the cradle 11. The upper element 7a may consist of a plate also supporting the three-function stress control jacks described below, in the rear part of which an opening is provided to mount the support plate making up the cradle 11.

It is understood that the pivoting of the cradle 11 permits to modify the orientation of the rotation axes a1 of the right and left eccentrics 9 in planes Pl parallel to the median plane PL (FIG. 11) of the shaking system 4A-4B of the machine, so that such orientation modification permits to modify, simultaneously and in synch, the amplitude of the oscillatory movement of the actuation shafts 6 of said shaking system, and consequently, the amplitude of the shaking movement of the shakers 5 attached to the actuation or activation shafts of said shaking system 4A-4B.

The operation principle of the above-described device is simple. If one wishes to decrease the amplitude of movement of the shaking assemblies 4A, 4B, one needs only to pivot the cradle 11 supporting the eccentric systems 9 around the rotation axis a3 using said actuator 20 in order to decrease the angle α resulting from the movement of rotation and located between planes $Y_0$ consisting of both left and right axes a1 and the horizontal plane $X_0$ going through the horizontal axis a1 of the cradle support 11-eccentric system 9 assembly (FIGS. 6-9).

Figure 6:
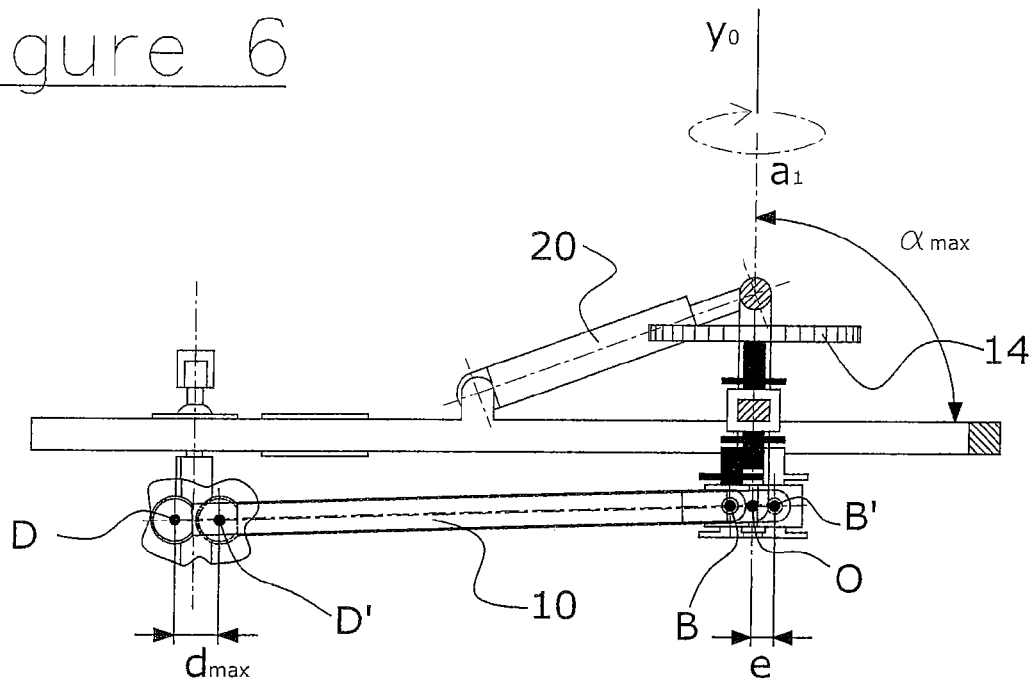
FIGS. 6 through 9 are schematic views showing the kinematics of this system.
Figure 7:
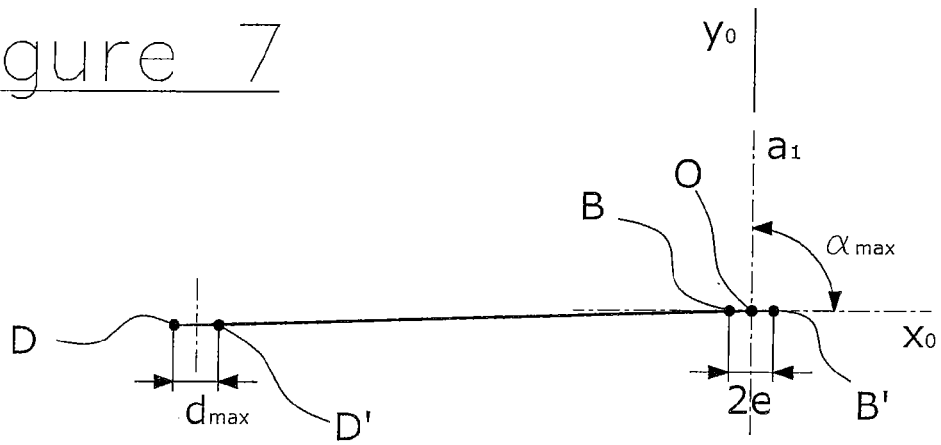
Figure 8:
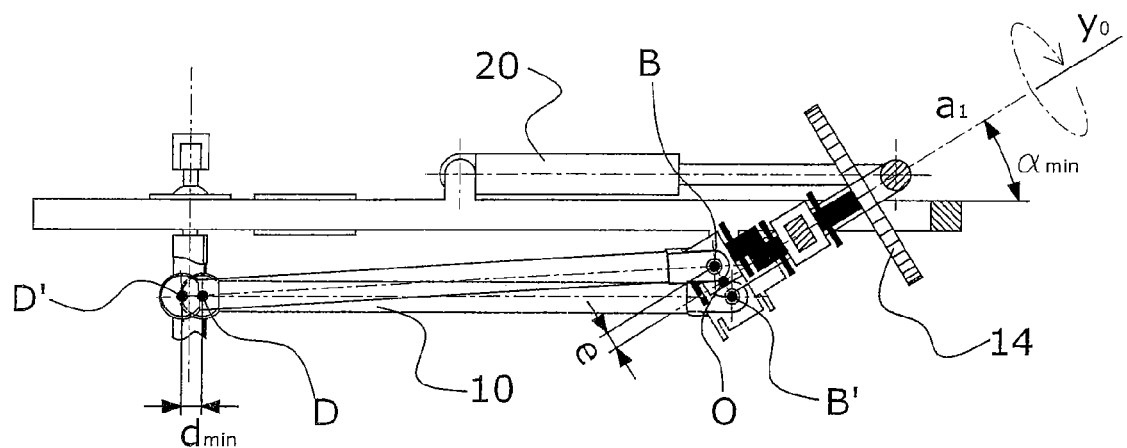
Figure 9:
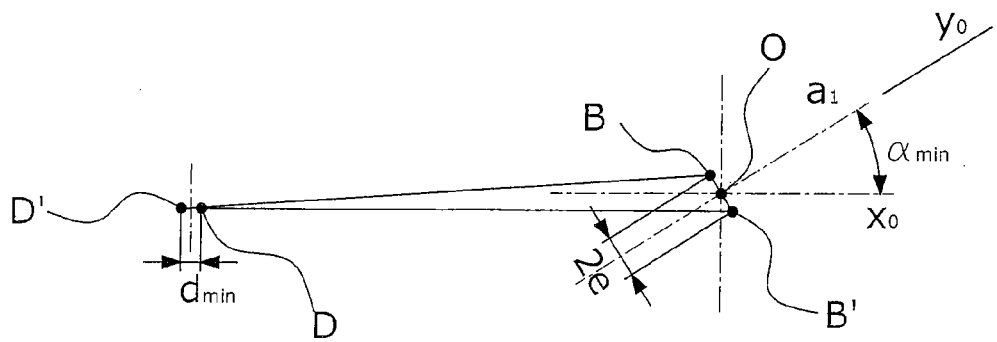

FIGS. 6 and 7 are schematic representations of the support cradle 11-eccentric system 9 assembly in maximum amplitude adjustment position, i.e., with an angle α close to 90° while FIGS. 8 and 9 are schematic representations of the support cradle 11-eccentric system 9 assembly in "mini" amplitude adjustment position, i.e., with a minimum angle α.

Inclining the support cradle 11-eccentric device 9 assembly according to the angle α causes an inclination B-B' equal to twice that of the eccentric e, i.e., 2e, as shown in FIGS. 4 through 7.

If the angle α measured between the planes $Y_0$ and $X_0$ is close to 90°, the length of the segment B-B', i.e., 2e, is roughly equal to the segment D-D', itself equal to the value of the displacement d of the connecting rod 10 link on the shaking shaft 6.

Figure 11:
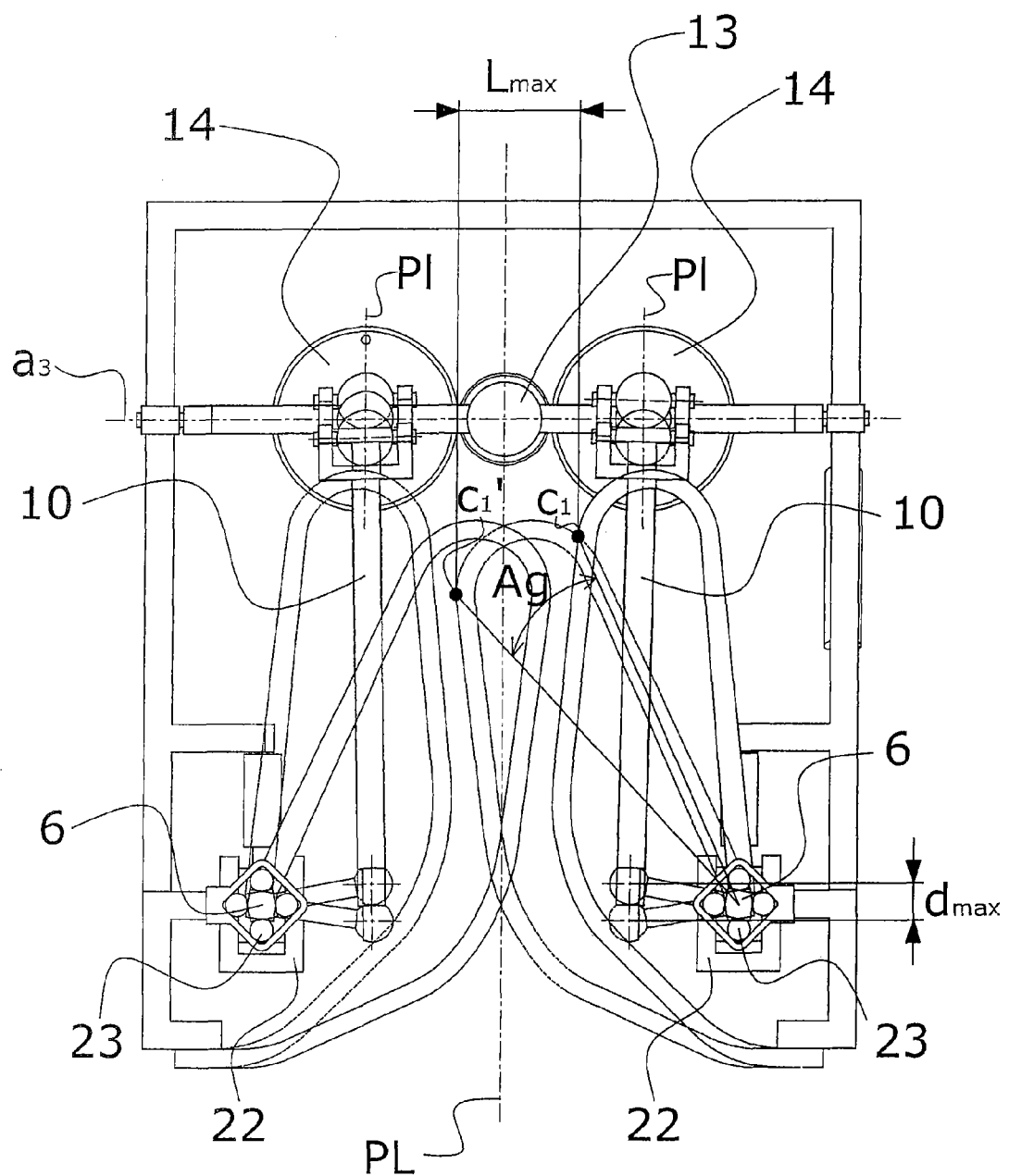
FIG. 11 is a top plan view showing the shakers in a maximum amplitude adjustment position.

Since the segment D-D' cannot be greater than the segment B-B', this is thus the maximum amplitude adjustment position for shakers 5, as shown in FIG. 11.

Figure 12:
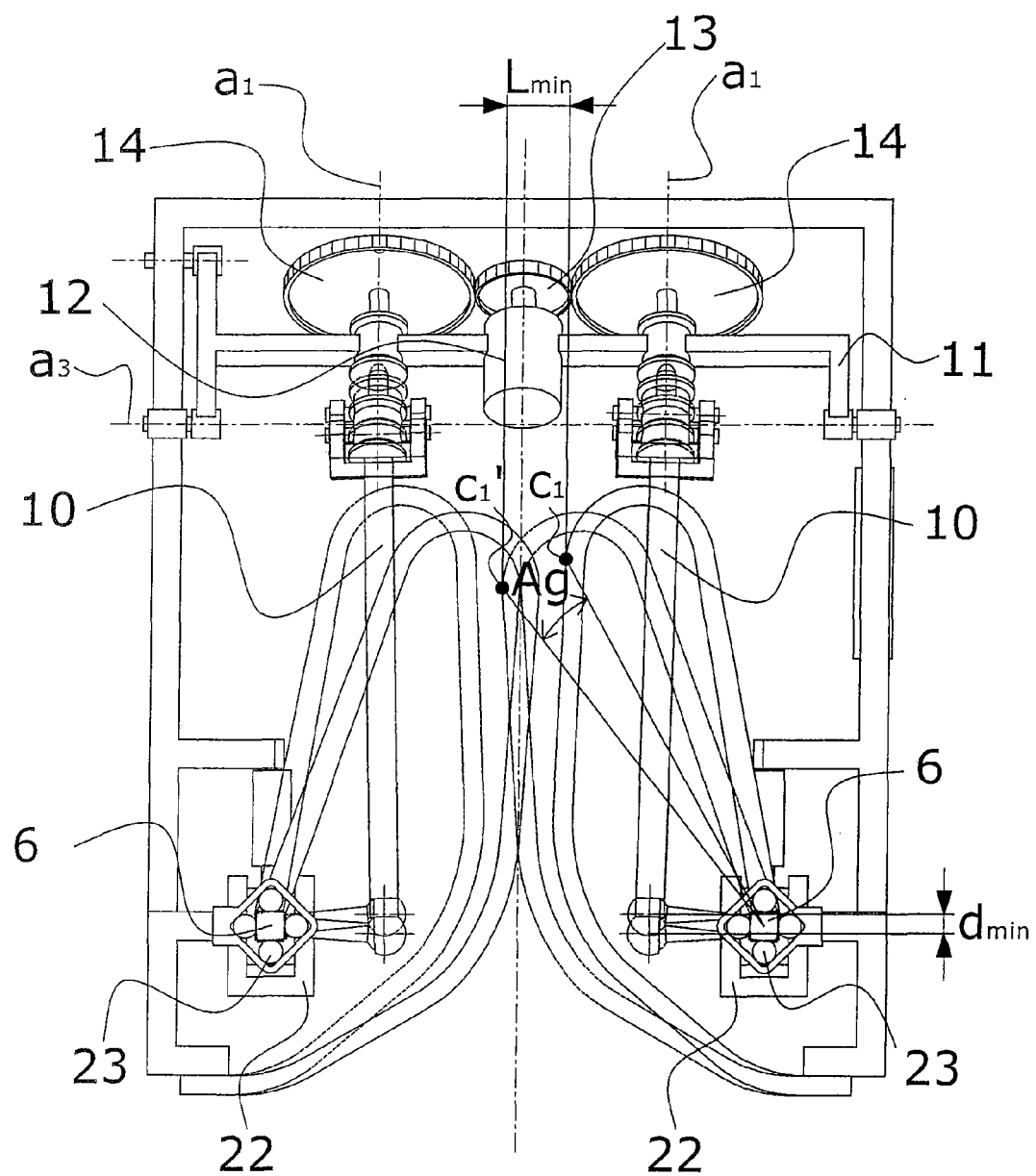
FIG. 12 is a top plan view showing the shakers in a minimum amplitude adjustment position.

If the angle α is minimum, the length of the segment B-B', i.e., 2e, does not change as it is a constant. On the other hand, the length of the segment D-D' decreases, which thus causes a reduction of the displacement d of the connecting rod 10 link on the shaft 6, and, consequently, causes a reduction of the activation angle Ag of the movement amplitude of the shaking shaft 6 and of the shakers 5 at the arbitrary reference point C1 of a shaker 5, as shown in FIG. 12.

Figure 10:
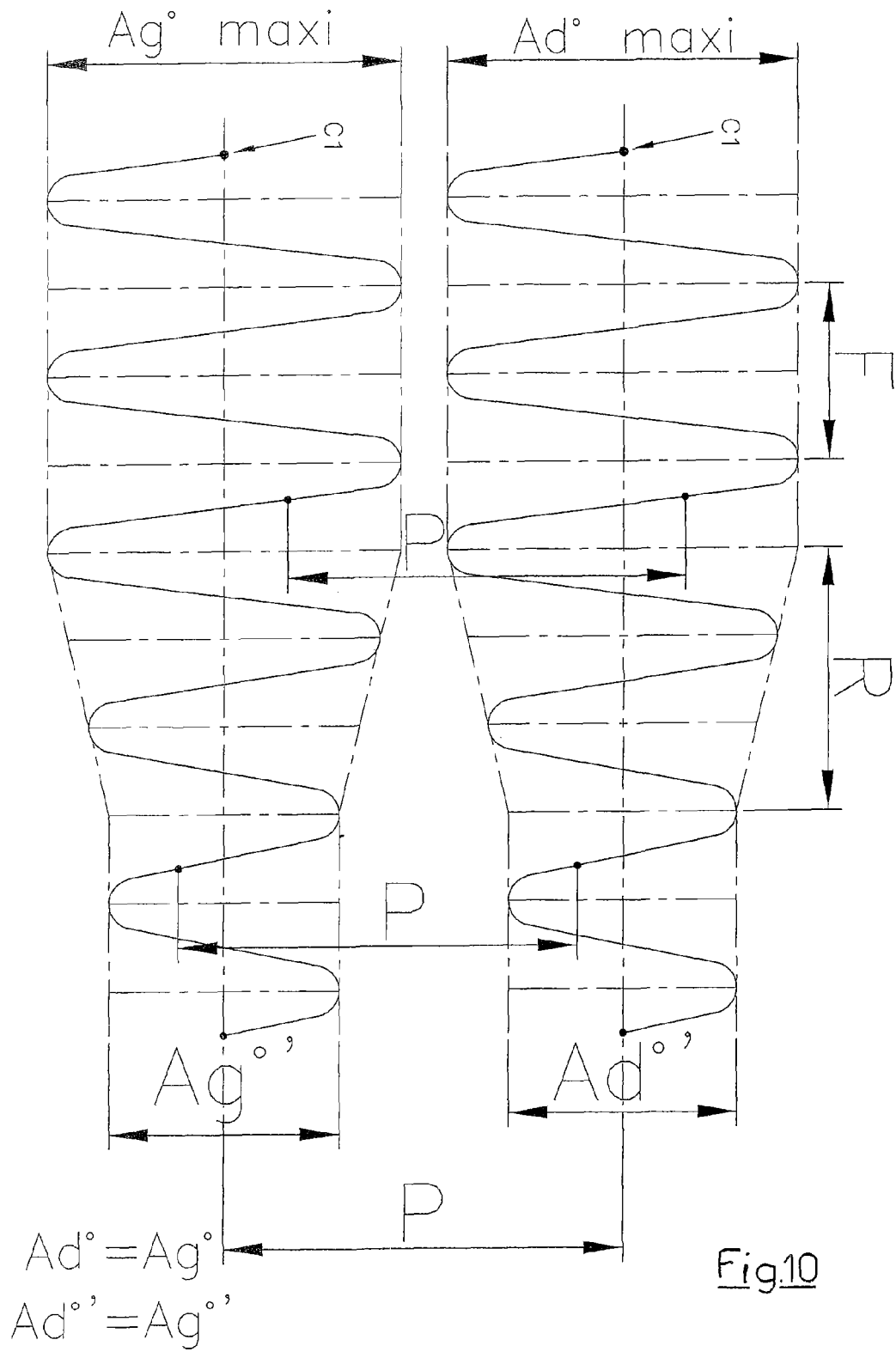
FIG. 10 is a diagram showing the trajectory of a reference point of two right and left shakers when varying the shaking amplitude.

FIG. 10 shows the theoretical trajectory of the arbitrary reference point C1 of the left and right shakers 5 when setting a decrease of the amplitude of movement of the shaking shaft 6 and of the shakers 5 during activation in rotation of both left and right eccentric systems.

The first part (top part of the curve) represents the trajectory of the points C1 in maximum amplitude with a rotational frequency F of the synchronized left and right eccentrics. The distance between both reference points C1 of the left and right shakers 5 is what is called the pinch adjustment P.

During the time R of amplitude decrease using the actuator 20, it is noted that the pinch value P does not change, which is very important to ensure the independence of the adjustments between the adjustment of said amplitude materialized by the activation angle Ag of the left and right shaking shafts 6 and the adjustment of said pinch materialized by the distance measured between the arbitrary reference points C1 of the left and right shakers 5.

According to another characteristic arrangement of the invention, the shaking shafts 6 of the shaking assemblies 4A, 4B are mounted with a capability of approx. 10° to 12° oscillatory movement around their longitudinal axis a4 and of a limited swinging amplitude around a point located in their lower part.

In order to achieve this oscillating-swinging movement, the top part of each shaking shaft 6 is mounted in a swivel bearing 21 located with a capability of forward-backward rectilinear movement in a guide 22 rigidly integral with the machine shaking system frame 7.

On the other hand, the bottom part of each shaking shaft 6 is mounted through a swivel bearing or an elastic bearing 23 (FIG. 16A, 16B) that may consist of a pivot of the type known under the name "ROSITA™" mounted in the lower part of the frame 7.

Figures 16A, 16B:
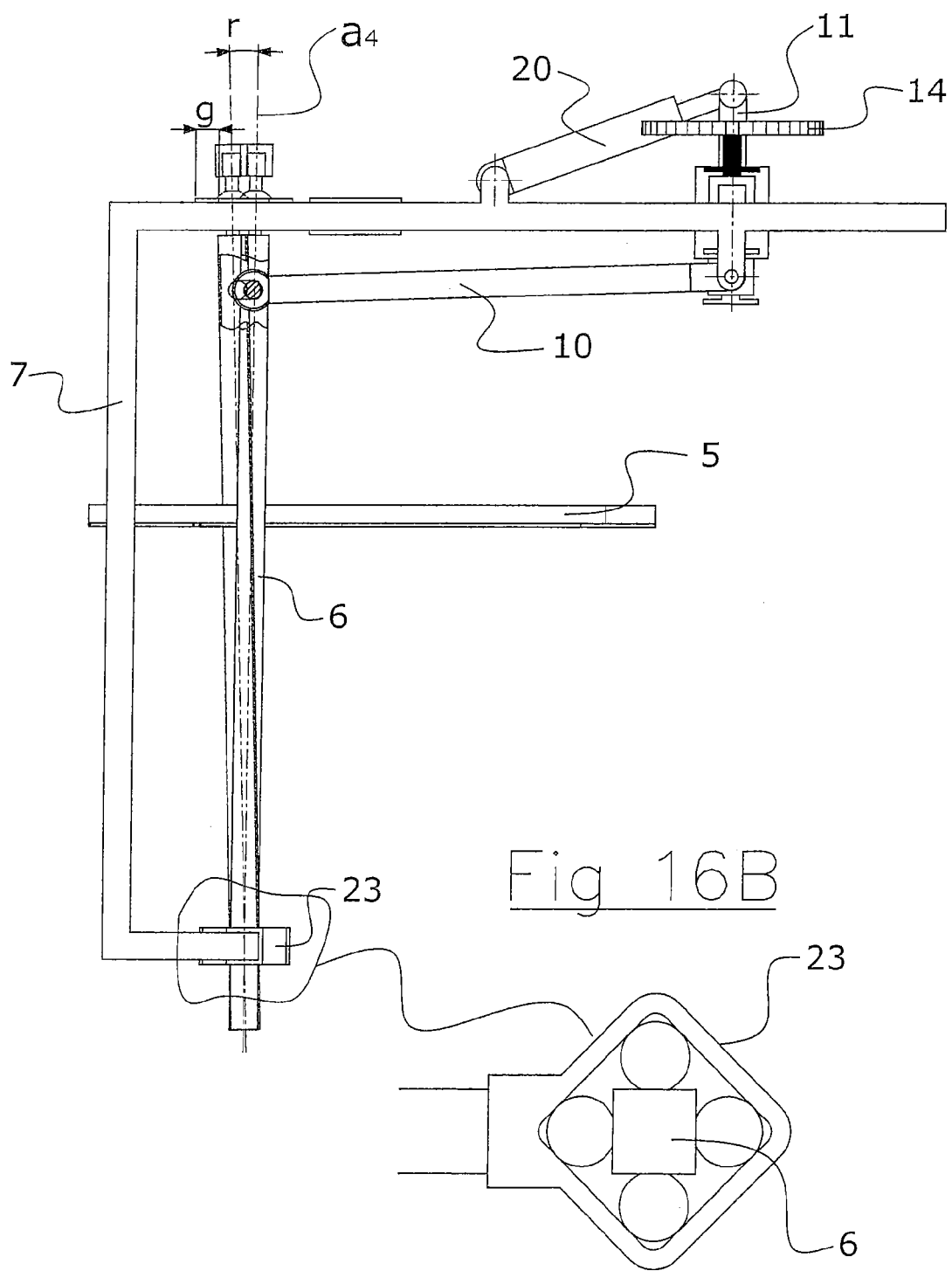
FIG. 16A is a front elevation and detail view showing the oscillating-swinging mounting of the vertical activation shaft of the shakers on each shaker assembly.
FIG. 16B is a cross-sectional view at a larger scale along line 16-16 from FIG. 16A.
Figure 17:
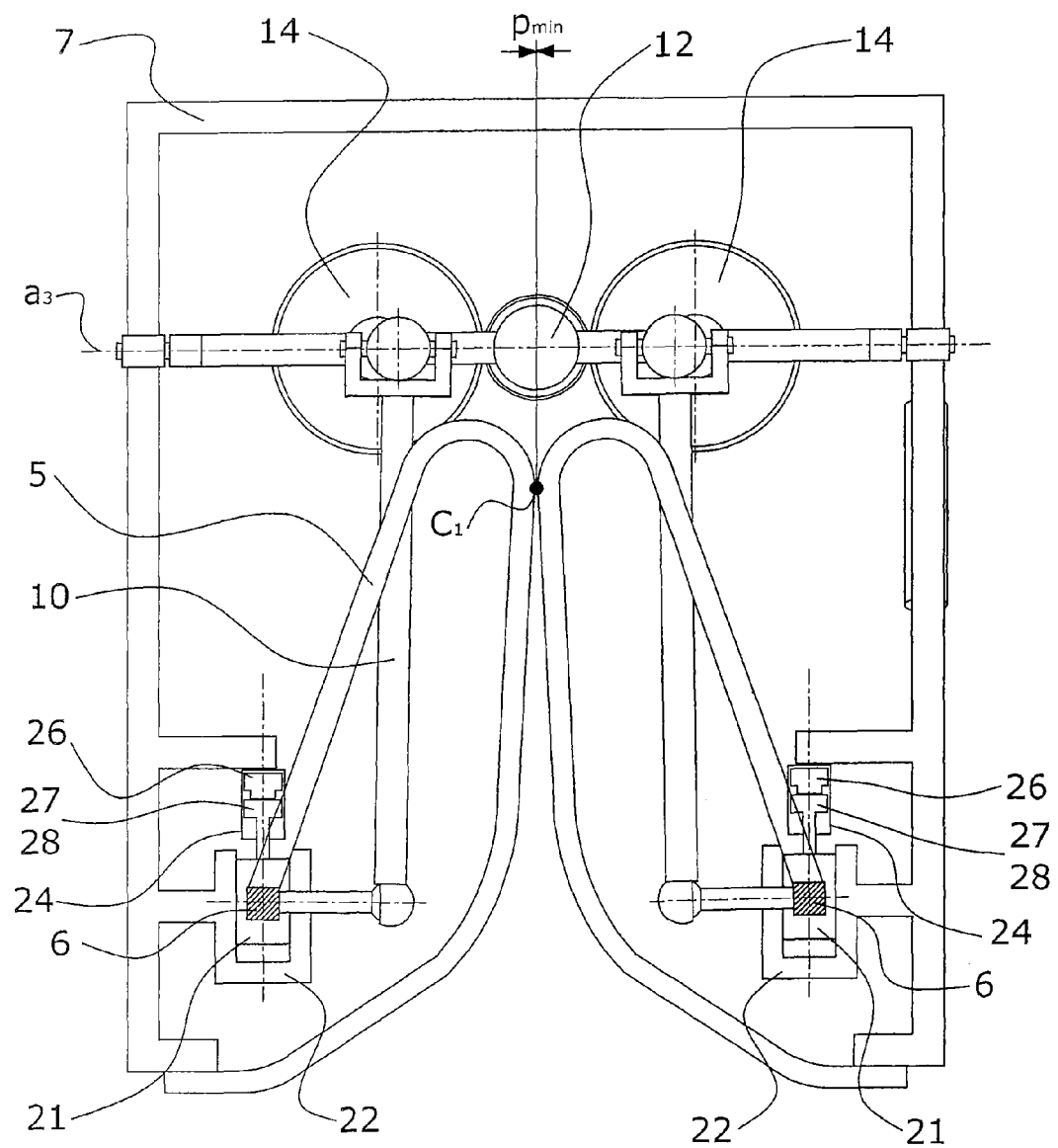
FIG. 17 is a schematic view showing the right and left shakers in minimum pinch position.
Figure 18:
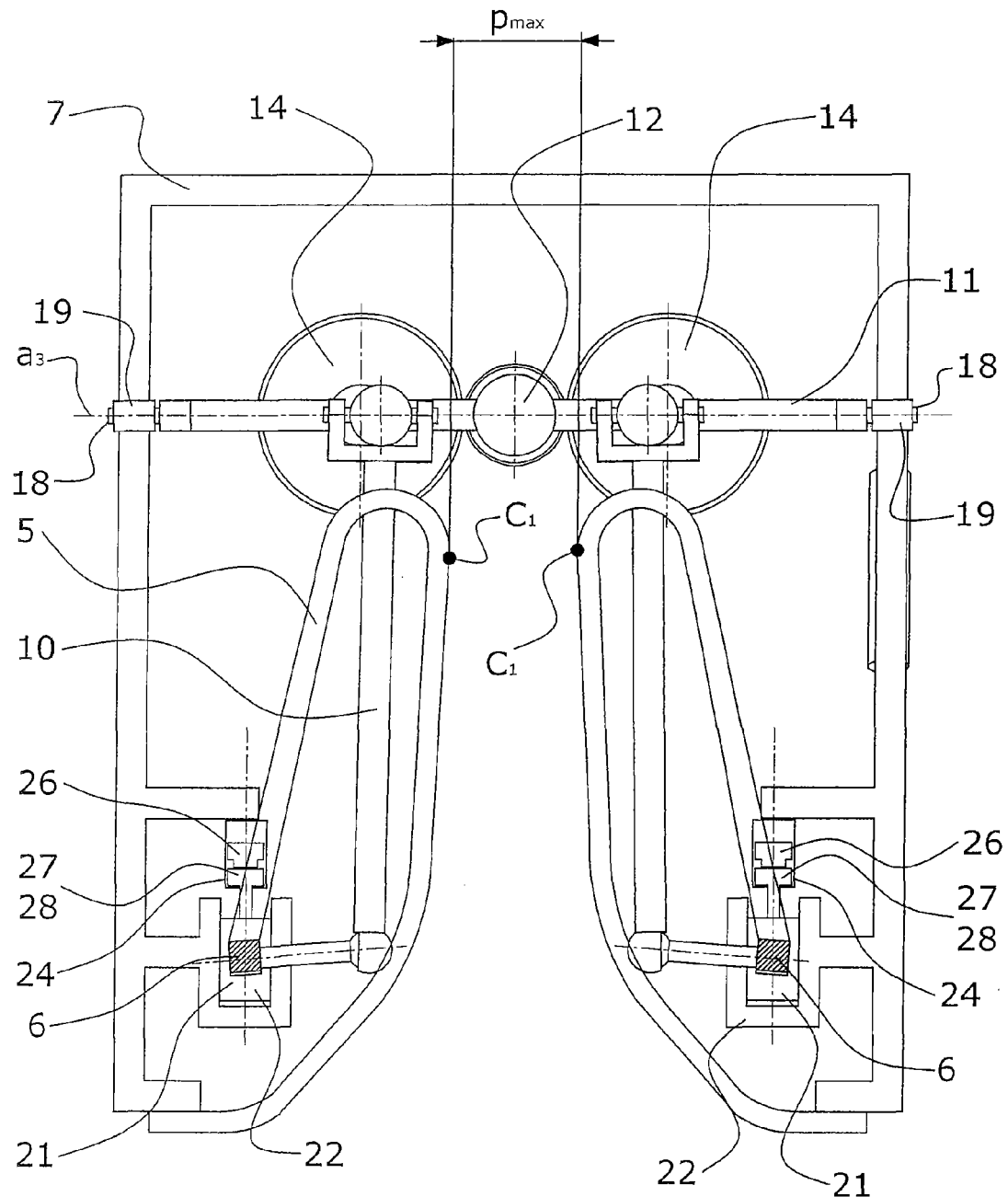
FIG. 18 is a schematic view similar to that in FIG. 17, showing the right and left shakers in maximum pinch position.

This elastic bearing ensures an oscillating link of the shaking shaft 6 while allowing it a certain degree of freedom, such as a slight forward or backward swinging in the axis of displacement of the upper swivel bearing 21 induced by the guide 22, as shown in FIG. 16A.

This particular movement with a very small swinging angle value, for example of the order of 0.5° to 1°, permits to pivot the shaking shaft according to its activation axis a4 in order to make all adjustments of pinch P, stress control, avoidance of big posts and opening at fragile stakes, regardless of the position of the connecting rod 10 in relation to the angular position of the rotation axis of the eccentric system 9.

It is understood that the shaking shafts 6 can be applied a combined oscillating-swinging movement consisting of a rotation around a main axis a4 and a forward or backward swinging with limited amplitude, oriented in the axis of the guide 22, around a point located in their bottom part and materialized by the bearing 23.

The positioning of each right or left swivel bearing 21 is ensured by a right or left stress control jack connected to said mobile bearing.

Figure 13:
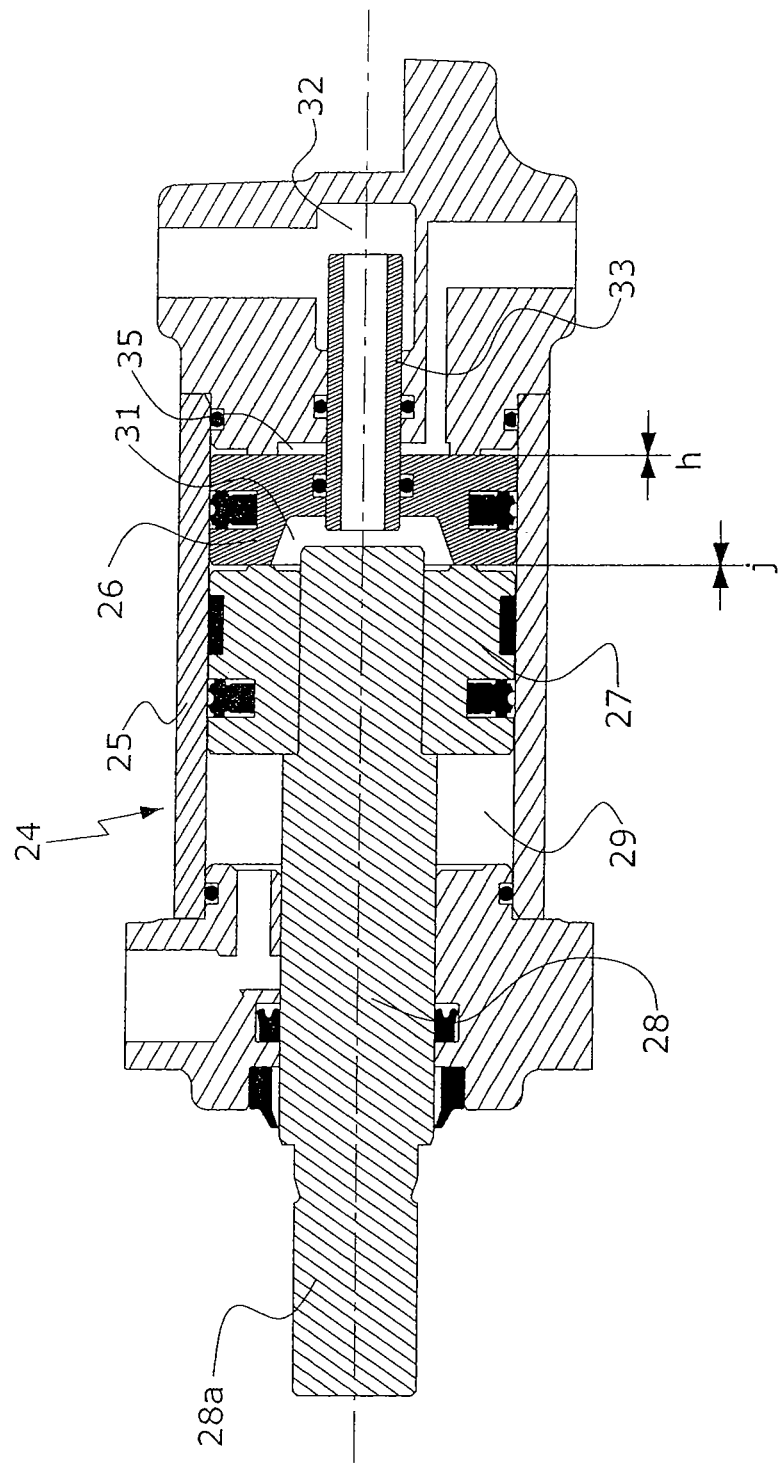
FIG. 13 is an axial cross-sectional view of one of the three-function stress control jacks connected to each mobile swivel bearing of the top part of the actuation shaft on each shaking assembly and shown in the minimum setting position of the shaker pinch adjustment.
Figure 14:
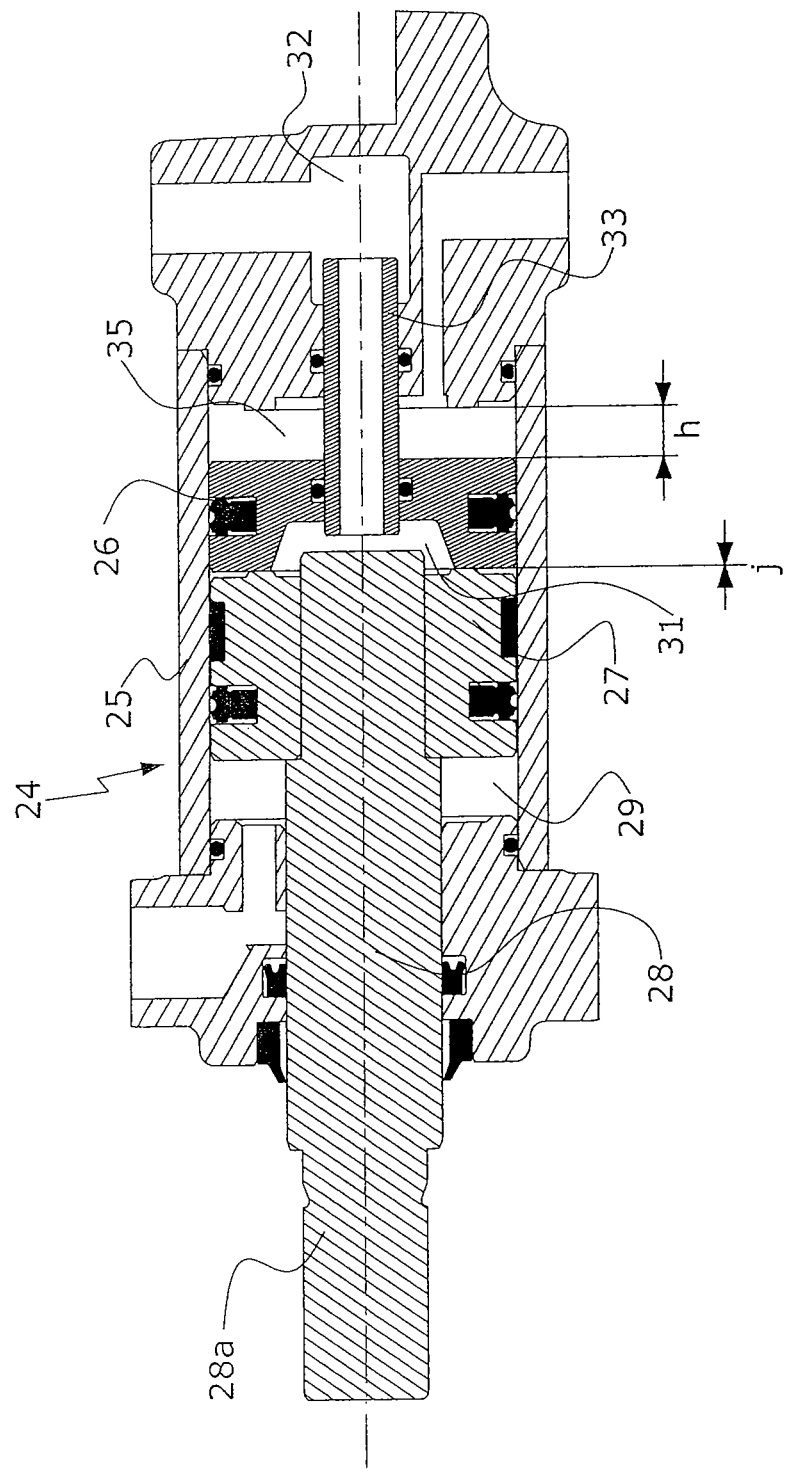
FIG. 14 is a sectional view similar to that on FIG. 13, with the jack shown in pinch intermediate setting position.
Figure 15:
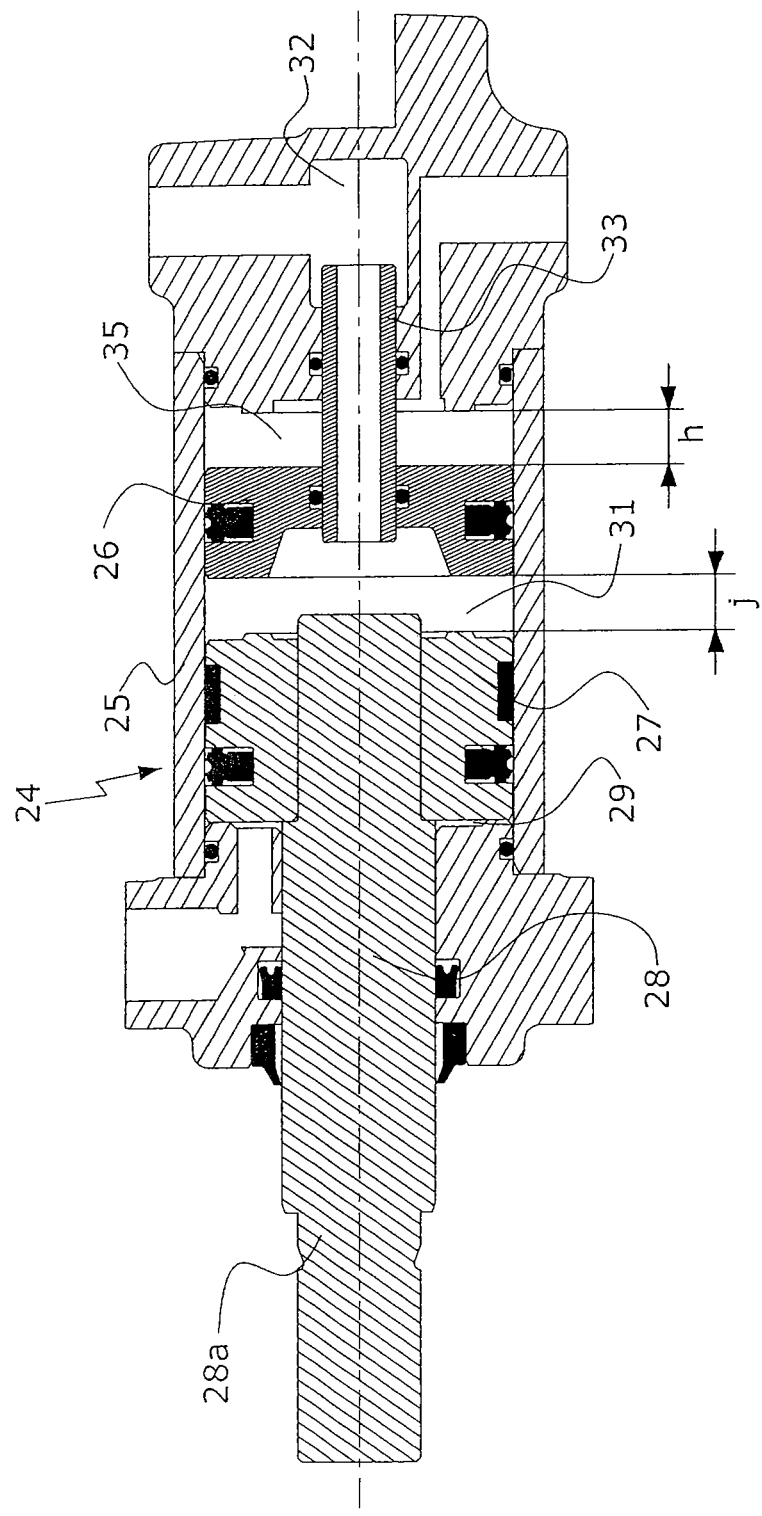
FIG. 15 is a similar sectional view to that in FIG. 14, showing the clearance position of the pinch adjustment.

FIGS. 13 through 15 show an advantageous embodiment of these jacks 24.

They comprise a cylindrical shell in which two pistons 26 and 27 are housed with an axial displacement capability.

The piston 27 is rigidly integral with a rod 28 whose end 28*a* protruding from the cylindrical shell 25 is attached to the mobile swivel bearing 21 in which the upper end of the actuation shafts 6 is mounted.

Figure 19:
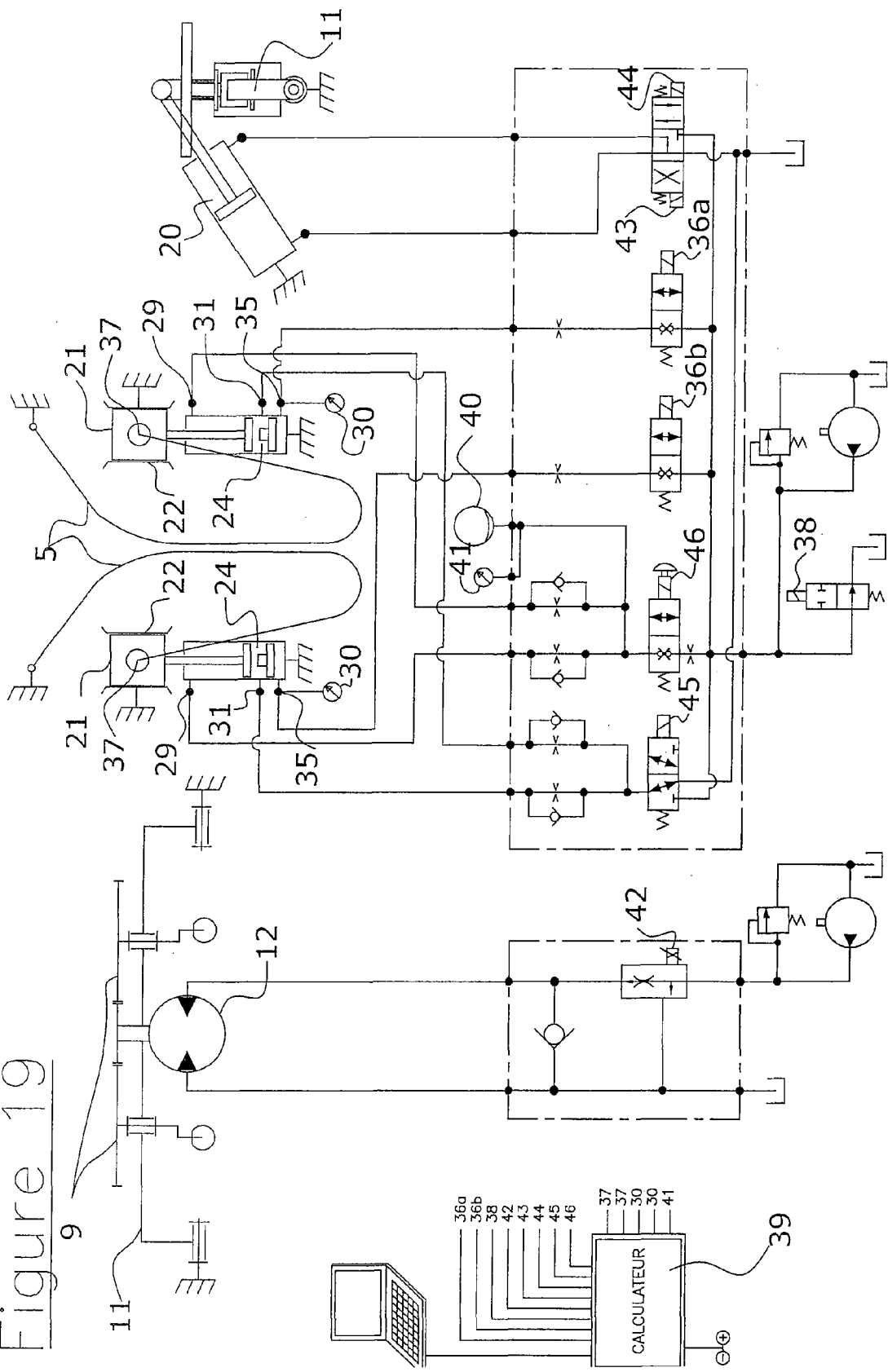
FIG. 19 is a schematic view of the hydraulic circuit of the mechatronic shaking control system.

The piston 27, called hereinafter rod piston 27-28, define a first chamber 29 connected to a pressure sensor (FIG. 19). It also defines, together with the piston 26, hereinafter called pinch piston, a second chamber 31 communicating through a hollow axial rod 33 running through said pinch piston 26 with a conduit 32 provided in the shell 25 of the jack 24.

This conduit 32 communicates with a pressurized hydraulic oil feed controlled by an electrovalve 45.

The pinch piston 26 also defines through its opposite face a third chamber 35 communicating, on one hand, with a pressurized oil controlled by an electrovalve 36*a* (right side) and by an electrovalve 36*b* (left side) and, on the other hand, with the pressure sensor 30.

An example of the constitution of the electro-hydraulic circuit ensuring the operation of the left and right stress control jacks 24 is shown schematically in FIG. 19.

In this figure:
reference 42 represents a proportional three-way valve whose function is to regulate the hydraulic supply rate for the motor 12 driving in rotation both left and right eccentrics 9 to ensure regulation of the shaking frequency; and
reference 43-44 represents a double-acting electrovalve designed to actuate the jack 20 used to adjust the inclination of the cradle 11 and, consequently, the amplitude of the shaking movement.

According to an important characteristic of the invention, the jacks 24 are stress control jacks with three functions, namely:

a) An adjusting function of the pinch P between the right and left shaking assemblies 5;
b) A stress control function of the swivel bearing 21; and
c) A quick opening function of the shakers 5.

I—Pinch Adjustment Function Between the Right and Left Shakers 5, Materialized by the Distance P Measured Between the Arbitrary Points C1 of Said Shakers.

This function is ensured by the oil volume supply of the first chamber 35 of the right or left jacks 24.

The principle is simple, one needs only to move the swivel bearing 21 in its guide 22, for example toward the front of the machine and in the axis of said guide to generate a swinging of the shaking shaft 6 around its bottom attachment (bearing 23), for the same position of the connecting rod 10.

This swinging is measured by potentiometric angular sensors 37 on the left side and the right side, for example installed at the upper end of the actuation shafts 6. To do so, one needs only to operate simultaneously the right 36*a* and left 36*b* electrovalves of the control hydraulic circuit and also a third electrovalve 38 of said circuit, simultaneously, in order to cause the displacement of the piston 26, itself bearing on the rod piston 27 maintaining the swivel bearing 21 in the guide 22. This displacement is measured by the potentiometric sensors 37 for the right and left sides to ensure a control closed loop for position adjustment between the electrovalves 36*a*, 36*b*, 38, and said potentiometric sensors 37.

To increase the pinch value between the shakers 5, one needs only to operate the electrovalves 36, 38 simultaneously; on the contrary, to reduce the pinch value P between the shakers 5, one needs only to operate the right and left electrovalves 36 only for the chamber 32 of the right and left jacks 24 to deflate under the action of the effective stress control static pressure in the chamber 29 of said right and left jacks 24.

II—Stress Control Function of Swivel Bearing 21 for Top Attachment of Both Left and Right Shaking Shafts 6.

The purpose of this function is to ensure the static holding of the left and right swivel bearings 21 in the guide axis 22 and bearing on the pinch adjustment internal piston 26 of the right and left jacks 24, up to a certain stress measured by the pressure sensors 30, measuring a pressure resulting from the stresses due to the mechanical inertia counter-reaction of the shaking shaft 6 of the shaker assembly 4A or 4B and to the bearing of the shakers 5 on the vegetation, vine stocks or palisade posts.

One needs only to inflate the chamber 29 of the right and left stress control jacks 24 to a certain pressure Pa defined in the manner described below (see FIGS. 21A, 21B and 22A, 22B) to make the automatic and self-adapting adjustment of the stress control.

The resulting pressure Pc in the pinch adjustment chamber 35 of the right and left jacks 24 is measured continuously, for example one hundred times per second, so that the average measured pressure minimum does not fall below the programmed threshold pressure Ps, for example 7 bars.

Figure 20:
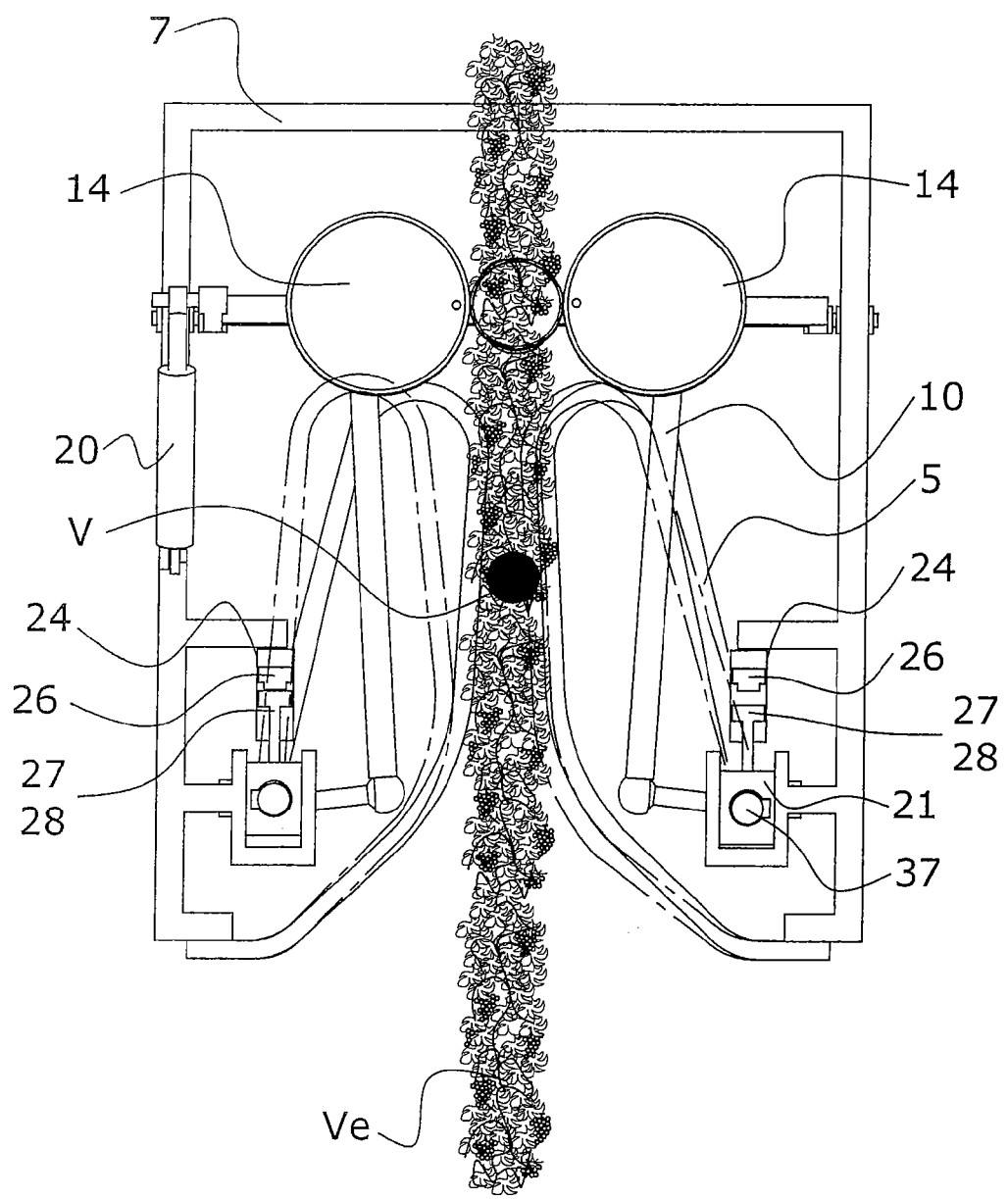
FIG. 20 is a top plan view showing an example of running by large section posts, causing the activation of the stress control jack and pinch clearance.

This "mini" threshold pressure can be exceeded only in the case where the shaker assembly 5 collides with a big vine post V, as shown in FIG. 20 to preserve the shaking control eccentric systems and to transmit only the stresses necessary to shake the vegetation Ve.

As shown in FIGS. 21A, 21B and 22A, 22B, the system is self-adapting. As a matter of fact, pressure measurement in the chamber 29 of the right and left jacks 24 is directly proportional to the number of shakers 5 mounted on the shaking shafts 6 and to the strength of the vegetation Ve to be shaken.

Figure 21A:
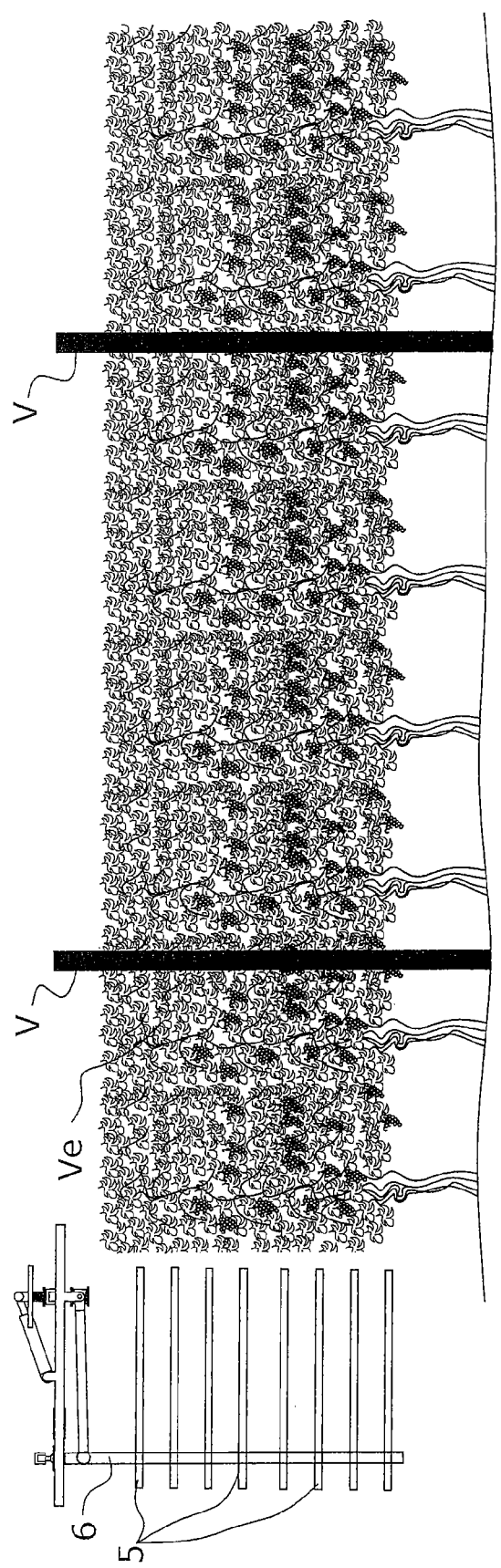
FIG. 21A shows a schematic view of a vine with dense vegetation requiring the use of shaking assemblies consisting of numerous shakers.
Figure 21B:
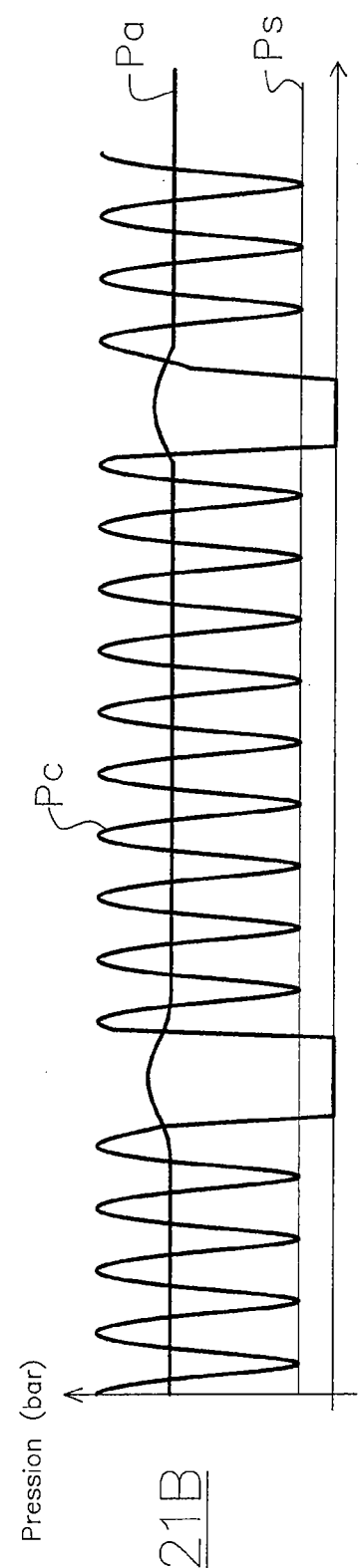
FIG. 21B is a diagram showing the high pressure measured in the pinch piston chamber of the three-function stress control jacks.
Figure 22A:
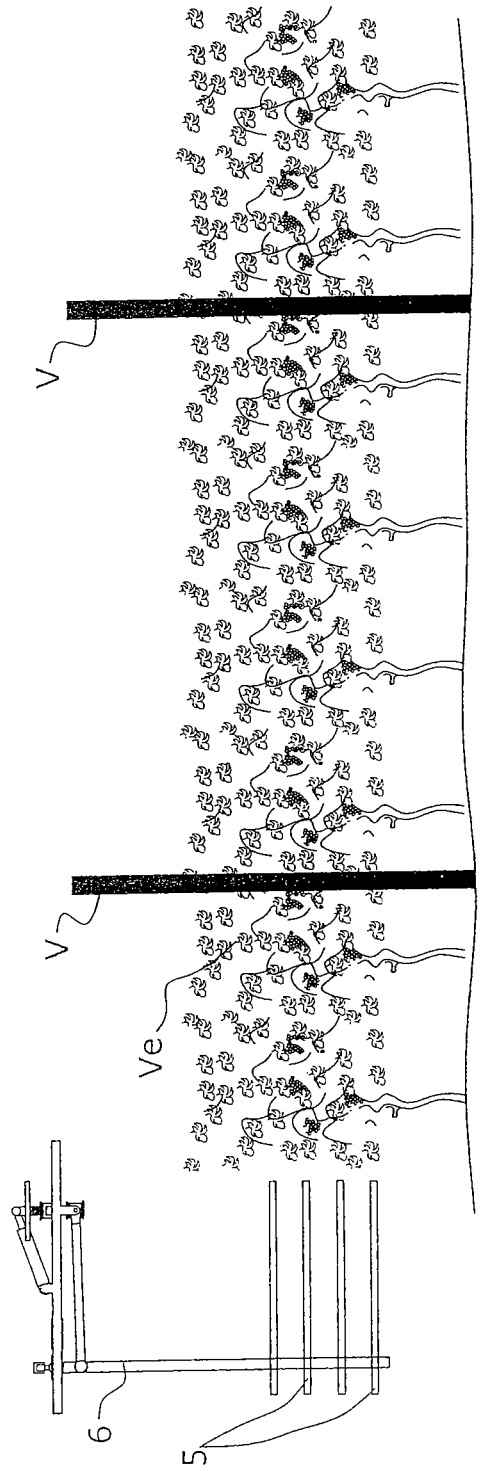
FIG. 22A shows a schematic view of a vine with little vegetation requiring the use of shaking assemblies consisting of a smaller number of shakers than above.
Figure 22B:
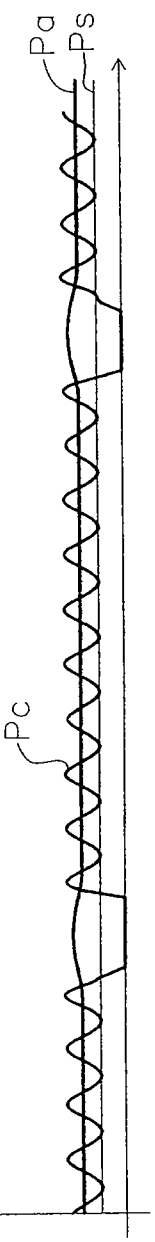
FIG. 22B is a diagram showing the low pressure measured in the pinch piston chamber of the three-function stress control jacks.
Figure 23:
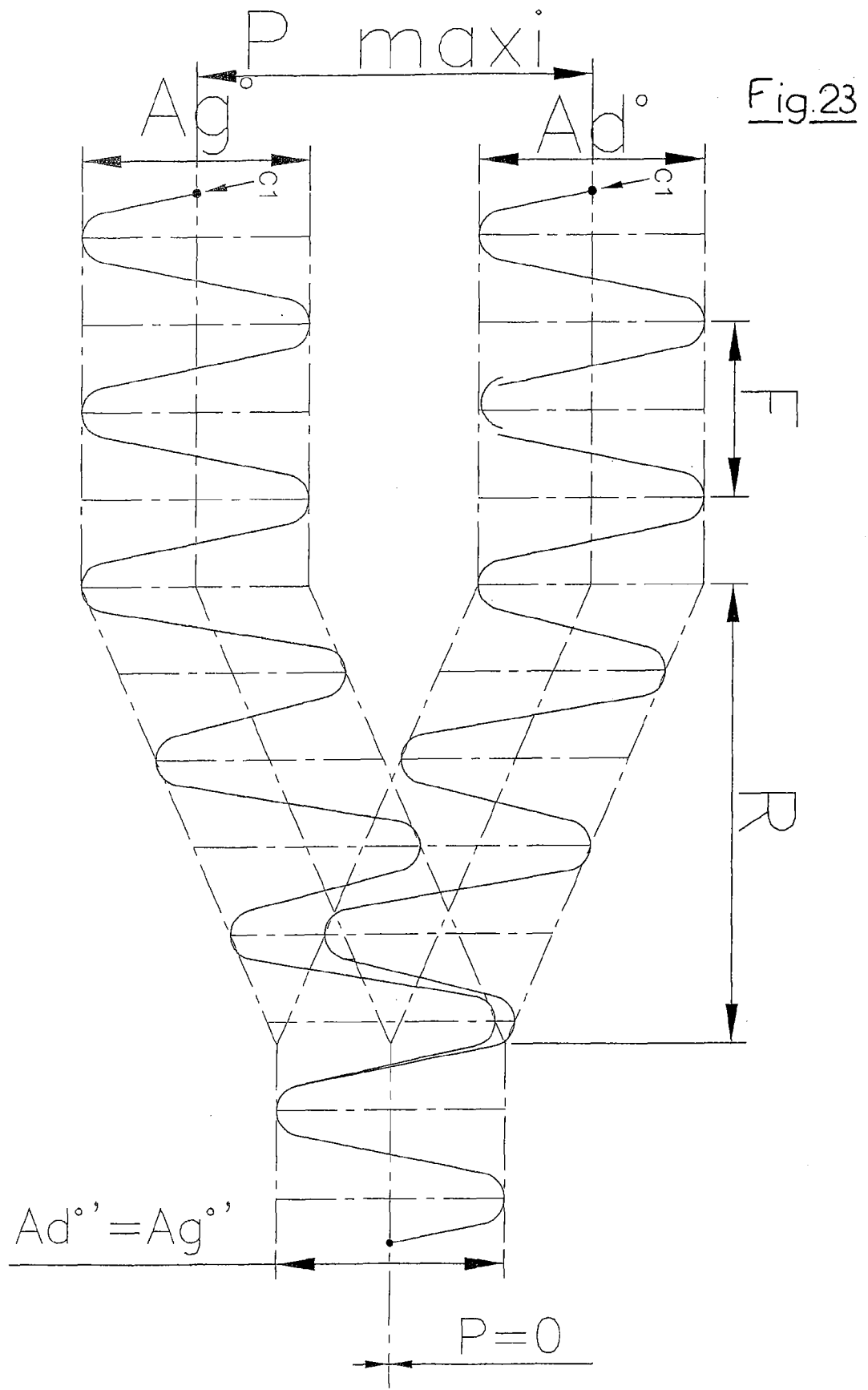
FIG. 23 is a diagram showing the pinch adjustment without modifying the amplitude.

In FIGS. 21A and 21B, one can see that the pressure signal Pc is greater than in FIGS. 22A and 22B for the simple reasons that one can work with a more or less large number of shakers 5, with more or less strong vegetations, with more or less high shaking frequencies and with more or less high amplitudes, which leads to an infinite number of figure cases and thus requires an intelligent and self-adapting system.

A calculator 39 is connected to the right and left pressure sensors 30, and based on the pressure measurements explained above, decides to inflate or deflate the hydraulic pressure Pa of the stress control in the chamber 29 by operating the electrovalves 46, 38 and by inflating a reference oil elastic accumulator 40 to an elastic pressure Pa and measured by a dedicated pressure sensor 41.

One needs only to operate one of the electrovalves 36, by itself, to deflate pressure Pa, in order to reduce the pressure Pa.

FIG. 13 shows the stress control jack 24 in mini pinch adjustment position P of the shakers 5. The distance h is equal to zero.

FIG. 14 shows the stress control jack 24 in intermediate pinch control position P. The piston 26 is off the bottom of the chamber 32 to a distance h from said bottom greater than zero.

FIG. 15 shows the stress control jack 24 with the piston 26 in the same position but with the stress control holding piston 27 off the pinch adjustment piston 26 in the case, for example, where the shaker assembly 5 hits a big vine post V.

As soon as the post is out of the active zone of the shakers 5, the stress control rod piston 27 returns to its initial place in contact with the pinch P adjustment piston 26 of the shakers 5. The accuracy of the pinch adjustment between the shakers 5 remains intact and unchanged.

III—Quick Opening Function of the Shakers.

Figure 2:
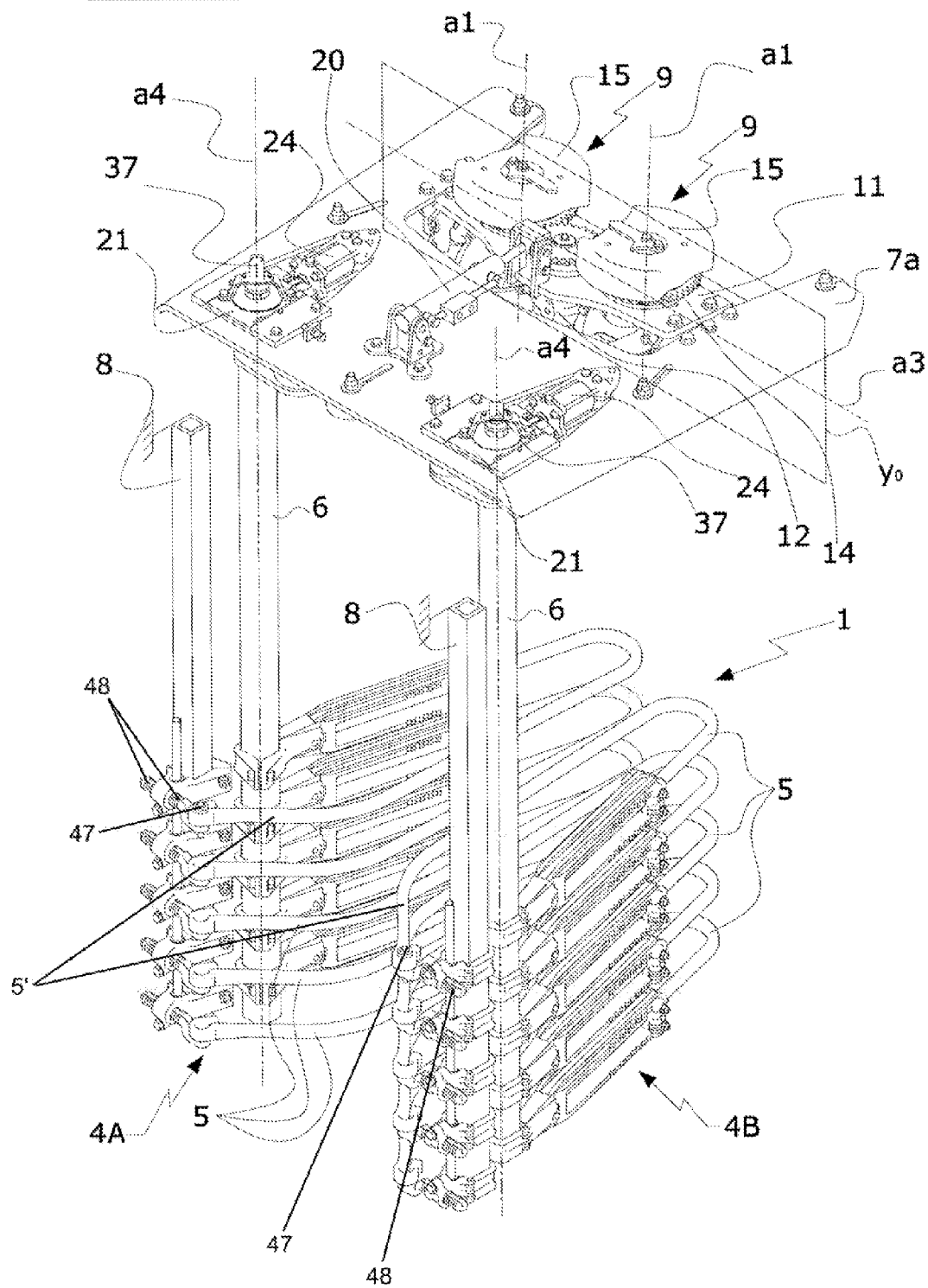
FIG. 2 is a simplified perspective view of the schematic type and at an enlarged scale of the shaking device and of the mechatronic shaking control of this machine.
Figure 3:
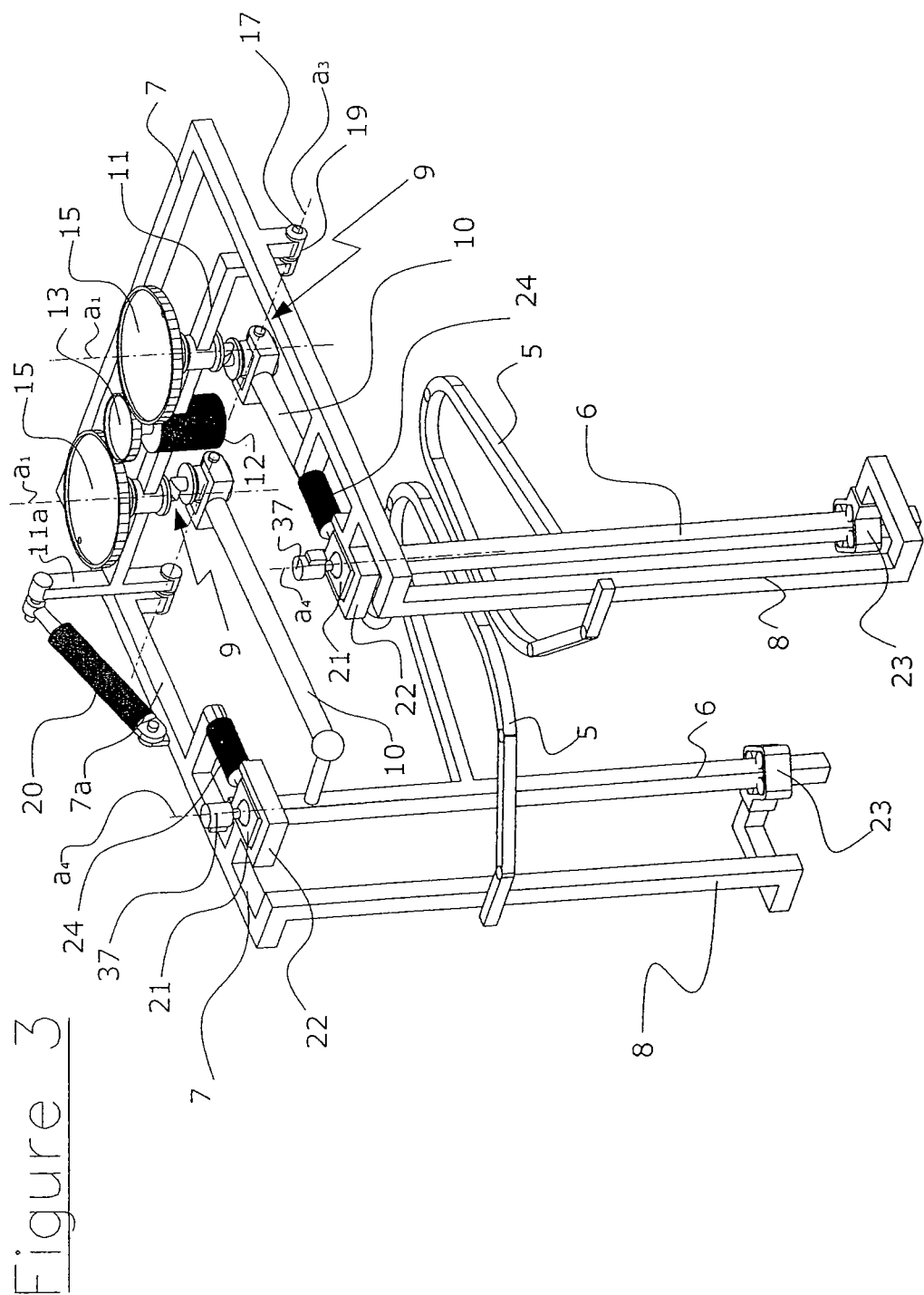
FIG. 3 is a perspective view of the schematic type of this mechatronic shaking system.
Figure 4:
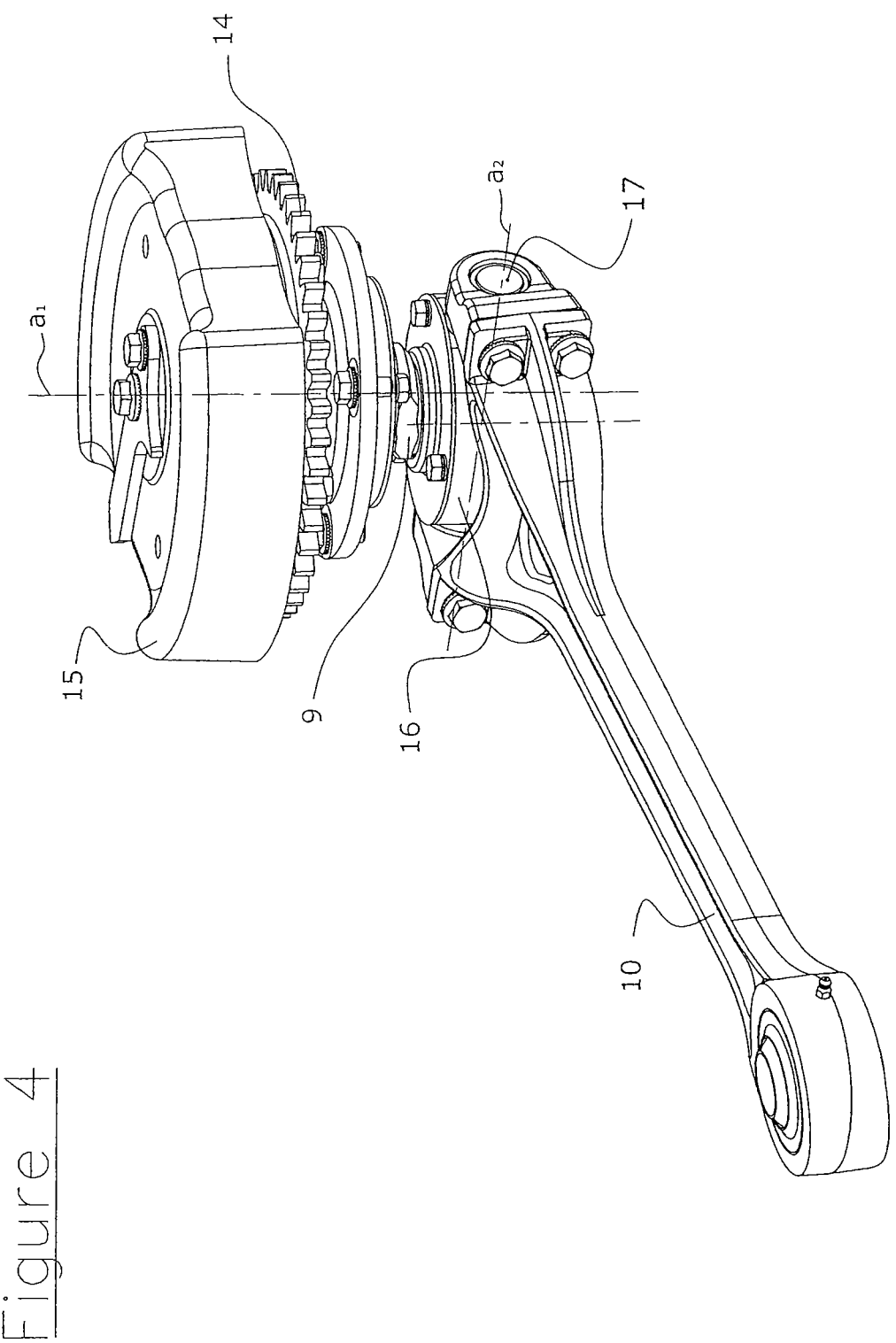
FIG. 4 is a perspective view of one of the eccentric drive systems of the actuation shaft on a shaker assembly.
Figure 5:
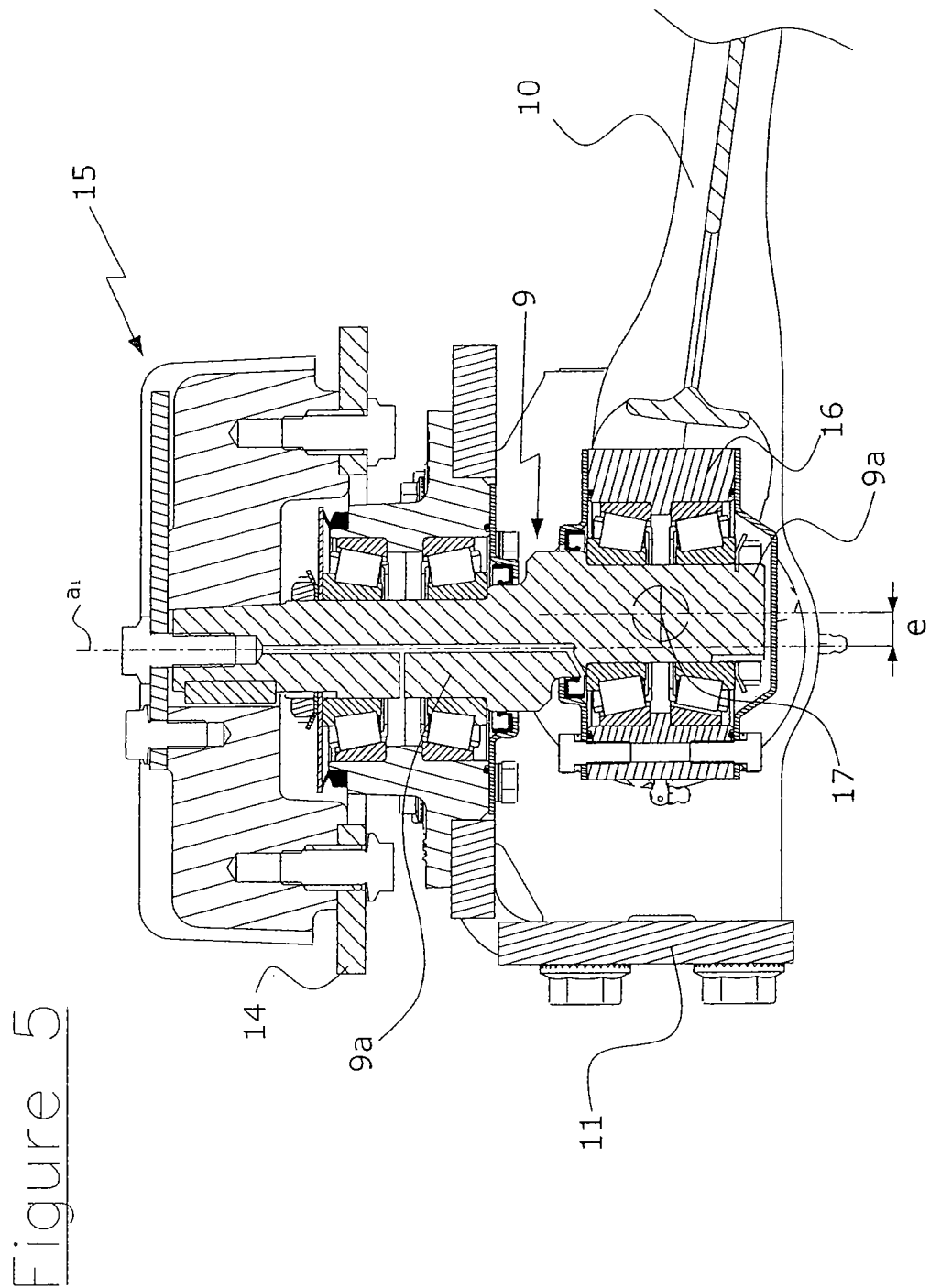
FIG. 5 is an axial cross-sectional view of this eccentric system.

For example, when running by a delicate vine post in the shaking system 4A-4B, it is possible to operate the opening of the right and left stress control jacks 24 by supplying intentionally the chamber 32 of said jacks with hydraulic oil in order to open the pinch distance P between the shakers so as to protect the delicate post against any too violent contact with said shakers. The opening command comes from the calculator 39 and from an information transmitted to the latter by post detectors 47 connected to said calculator and mounted on the front end or close to the front end of the active branch 5a of at least one of the shakers of each shaking assembly 4A and 4B, preferably on the upper shaker 5' of each assembly. This post detector may consist of a well-known shock sensor, such as for example an accelerometer. The front end of the active branch of the shaker being attached to the shaft 8 through devices known as SILENTBLOCS™ 48 (FIG. 2).

In order to effect these movements of the right and left jacks 24, one needs only to operate the right or left electrovalves 45 and 38, via the calculator 39, to supply the chamber 31 of said jacks very quickly with hydraulic oil and when running by a delicate post in the shaking system. The rod piston 27-28 moves rapidly to effect the opening of the shakers 5. Once the delicate post is out of the active zone of the shakers 5, one needs only to release the activation of the electrovalves 36, 38 to deflate the control chamber 32, until the rod piston 27-28 returns to its initial place, i.e., in contact with the piston 26, in the pinch adjustment position set before the opening operation when running by the post.

The invention concerns also a mechatronic shaking control method for berry harvesting machines, harvesting machines of the type comprising a shaking system 4A-4B consisting of two berry detaching assemblies 4A, 4B mounted face to face and each comprising a plurality of superimposed shakers 5, for example consisting of flexible bars, attached through their ends to two vertical shafts 6, 8 of which one (6) at least is an oscillating actuation shaft controlled by a mechatronic shaking control permitting to apply to it an oscillatory movement, characterized in that this mechatronic shaking control is achieved using an eccentric system 9 connected to said actuating shaft 6 through a connecting rod 10, and in that the amplitude of the oscillatory movement of said actuating shaft 9 is adjusted in a plane Pl parallel to the median plane PL of the machine and thereby also the amplitude of the shaking movement of the shakers assembly 5.

According to a preferred embodiment, activation of the oscillating actuation shafts 6 is achieved using two eccentric systems 9 mounted on a swinging support or cradle 11 and by actuating these two eccentric systems 9 in rotation, simultaneously and in synch, using a common actuator 12, preferably consisting of a hydraulic motor, installed on said cradle 11, and of a mechanical means of transmission with positive drive 13, 14, also mounted on said cradle whose pivoting is achieved by an actuator 20 and permits to achieve, simultaneously and in synch, an identical orientation of the rotation axes a1 of the eccentrics and thus to adjust the amplitude of the shaking movement of the shaker 5 of the shaking system 4A-4B.

We claim:

1. A berry harvesting machine comprising:
   a first berry detaching assembly; and
   a second berry detaching assembly in face-to-face relationship with said first berry detaching assembly, each of said first and second berry detaching assembly comprising:
      a plurality of superimposed shakers, each of said plurality of superimposed shakers being a flexible bar shaker;
      a first vertical shaft affixed to one end of said plurality of superimposed shakers;
      a second vertical shaft attached to another end of said plurality of superimposed shakers, at least one of said first and second vertical shafts being an oscillating actuation shaft;
      a mechatronic shaking control cooperative with said oscillating actuation shaft so as to apply an oscillating movement thereto, said mechatronic shaking control comprising:
         an eccentric connected to said oscillating actuation shaft through a connecting rod, said eccentric having a rotation axis mounted with an angularly adjustable orientation in a plane parallel to a median plane of the berry harvesting machine such that a change of the orientation changes an amplitude of an oscillating movement of said oscillating actuation shaft so as to change an amplitude of a shaking movement of the plurality of superimposed shakers.

2. The berry harvesting machine of claim 1, said eccentric comprising a pair of eccentrics mounted in side-by-side relationship in a cradle, said mechatronic shaking control further comprising:

an actuator connected to said pair of eccentrics so as to rotate the eccentrics simultaneously and sychronously, said actuator supported by said cradle; and a transmission having a positive drive supported by said cradle, said transmission cooperative with said pair of eccentrics, said cradle being pivotable by another actuator so as to cause an identical orientation of the rotation axes of said pair of eccentrics simultaneously and synchronously so as to adjust the amplitude to an orientation of the rotation axes.

3. The berry harvesting machine of claim 2, said transmission being a common gear link having a first toothed wheel driven by said actuator, said first toothed wheel meshed with a second toothed wheel, said second toothed wheel secured on a rotation shaft of each eccentric.

4. The berry harvesting machine of claim 3, said cradle being swingable around an axis perpendicular to and concurrent with the rotation axes of said pair of eccentrics.

5. The berry harvesting machine of claim 4, said cradle having pivots respectively at a left end and a right end thereof, said pivots being rotatably mounted respectively in bearings attached laterally onto a frame, said actuator connecting an upper element of said frame with an arm integral with said cradle.

6. The berry harvesting machine of claim 2, said connecting rod being attached to said eccentric through a bearing box, said bearing box having a pair of pins diametrically opposite to each other on said bearing box, said pair of pins having an axis perpendicular to the rotation axis of said eccentric.

7. The berry harvesting machine of claim 1, said eccentric being integral with a flywheel.

8. The berry harvesting machine of claim 1, said oscillating actuation shaft having an oscillating movement about a longitudinal axis thereof and a swinging movement about a point adjacent a lower end of said oscillating actuation shaft.

9. The berry harvesting machine of claim 8, said oscillating actuation shaft having a top portion mounted in a swivel bearing located in a guide rigidly integral with a frame.

10. The berry harvesting machine of claim 9, said swivel bearing being connected to a stress control jack.

11. The berry harvesting machine of claim 10, said stress control jack comprising:

a cylindrical shell;

a pair of pistons housed in said cylindrical shell, each of said pair of pistons having an axial displacement capability, one of said pair of pistons being rigidly connected to a rod having an end protruding from said cylindrical shell, said end of said rod being attached to said swivel bearing, said one of said pair of pistons defining a first chamber connected to a pressure sensor and a second chamber communicating with a supply and discharge line, said supply and discharge line communicating with a pressurized hydraulic oil feed controlled by an electrovalve, another of said pair of pistons defining a chamber communicating with the pressurized hydraulic oil feed controlled by another electrovalve.

12. The berry harvesting machine of claim 11, said another of said pair of piston having potentiometer sensors suitable for measuring displacements of the piston, said potentiometer sensors installed at an upper end of said oscillating actuation shaft.

13. The berry harvesting machine of claim 10, said stress control jack having a post detector connected to a calculator, said post detector mounted adjacent of front end a an active branch of at least one of the shakers.

14. The berry harvesting machine of claim 13, said post detector mounted on an upper shaker of said plurality of superimposed shakers.

15. The berry harvesting machine of claim 13, said post detector being a shock sensor.

16. The berry harvesting machine of claim 8, said oscillating actuation shaft having a bottom portion being mounted through either an elastic bearing or a swivel bearing.

* * * * *